US010130027B2

(12) United States Patent
Devloo et al.

(10) Patent No.: US 10,130,027 B2
(45) Date of Patent: Nov. 20, 2018

(54) WHEEL OR DISC SCRAPER AND AGRICULTURAL IMPLEMENT FEATURING SAME

(71) Applicant: Mark Devloo, Somerset (CA)

(72) Inventors: Mark Devloo, Somerset (CA); Gerard Devloo, Somerset (CA)

(*) Notice: Subject to any disclaimer, the term of this patent is extended or adjusted under 35 U.S.C. 154(b) by 0 days.

(21) Appl. No.: 15/419,856

(22) Filed: Jan. 30, 2017

(65) Prior Publication Data

US 2017/0231149 A1    Aug. 17, 2017

Related U.S. Application Data

(63) Continuation-in-part of application No. 14/378,523, filed as application No. PCT/CA2013/050115 on Feb. 14, 2013.

(60) Provisional application No. 61/598,639, filed on Feb. 14, 2012.

(51) Int. Cl.
  *A01B 15/16* (2006.01)
  *A01C 5/06* (2006.01)
  *A01B 23/06* (2006.01)

(52) U.S. Cl.
  CPC .............. *A01C 5/068* (2013.01); *A01B 23/06* (2013.01)

(58) Field of Classification Search
  CPC ......... A01B 23/06; A01B 35/32; A01B 71/08; A01C 5/068
  See application file for complete search history.

(56) References Cited

U.S. PATENT DOCUMENTS

| 523,508 A | | 7/1894 | Bauer et al. | |
|---|---|---|---|---|
| 873,142 A | * | 12/1907 | Wilhelm | A01B 23/06 172/558 |
| 975,577 A | * | 11/1910 | Shackelford | A01B 15/16 172/559 |
| 1,260,752 A | * | 3/1918 | Casaday | A01B 15/16 172/559 |
| 1,391,593 A | * | 9/1921 | Sweeting | A01B 15/16 172/168 |
| 1,791,462 A | | 2/1931 | Bermel | |
| 2,387,260 A | * | 10/1945 | Hargreaves | D01H 7/045 57/135 |

(Continued)

FOREIGN PATENT DOCUMENTS

CA    686867    5/1964

*Primary Examiner* — Jessica H Lutz
(74) *Attorney, Agent, or Firm* — Kyle R. Satterthwaite; Ryan W. Dupuis; Ade & Company Inc

(57) ABSTRACT

A scraper employs a support arm for mounting to a frame of an agricultural implement and a frustoconically bowl-shaped scraper member rotatably supported on the support arm in a position facing the open end of the bowl toward a ground-engaging wheel or disc. Different embodiments disclose unique mounting arrangements, including embodiments where a bearing has its outer race affixed to a closed end wall of the bowl, a bushing is fastened between the inner race of the bearing and a support arm situated outside the bowl to support the bowl in a manner rotatable about the bushing at an axial distance from the support arm, and a separate outer sleeve is disposed around the bushing in a freely rotatable manner to prevent wrapped straw accumulation between the bowl and the support arm during rotating use of the scraper.

12 Claims, 11 Drawing Sheets

(56) References Cited

U.S. PATENT DOCUMENTS

| | | | | |
|---|---|---|---|---|
| 2,454,002 A | * | 11/1948 | Paluck | B60S 1/68 |
| | | | | 280/855 |
| 2,571,285 A | | 10/1951 | Oehler | |
| 2,574,216 A | * | 11/1951 | Lindgren | A01K 89/015 |
| | | | | 242/270 |
| 2,770,469 A | | 11/1956 | Seda | |
| 2,849,261 A | * | 8/1958 | Bjerre | A01B 23/06 |
| | | | | 384/460 |
| 3,397,933 A | * | 8/1968 | Hatcher | A01B 23/06 |
| | | | | 172/604 |
| 4,669,550 A | | 6/1987 | Sittre | |
| 5,875,855 A | * | 3/1999 | Bruns | A01B 23/06 |
| | | | | 172/508 |
| 7,475,738 B2 | * | 1/2009 | Frasier | A01B 71/04 |
| | | | | 111/140 |
| 7,647,982 B2 | | 1/2010 | Meidinger | |
| 2008/0029280 A1 | * | 2/2008 | Meidinger | A01B 23/06 |
| | | | | 172/559 |
| 2012/0103642 A1 | * | 5/2012 | Stark | A01C 5/064 |
| | | | | 172/574 |

* cited by examiner

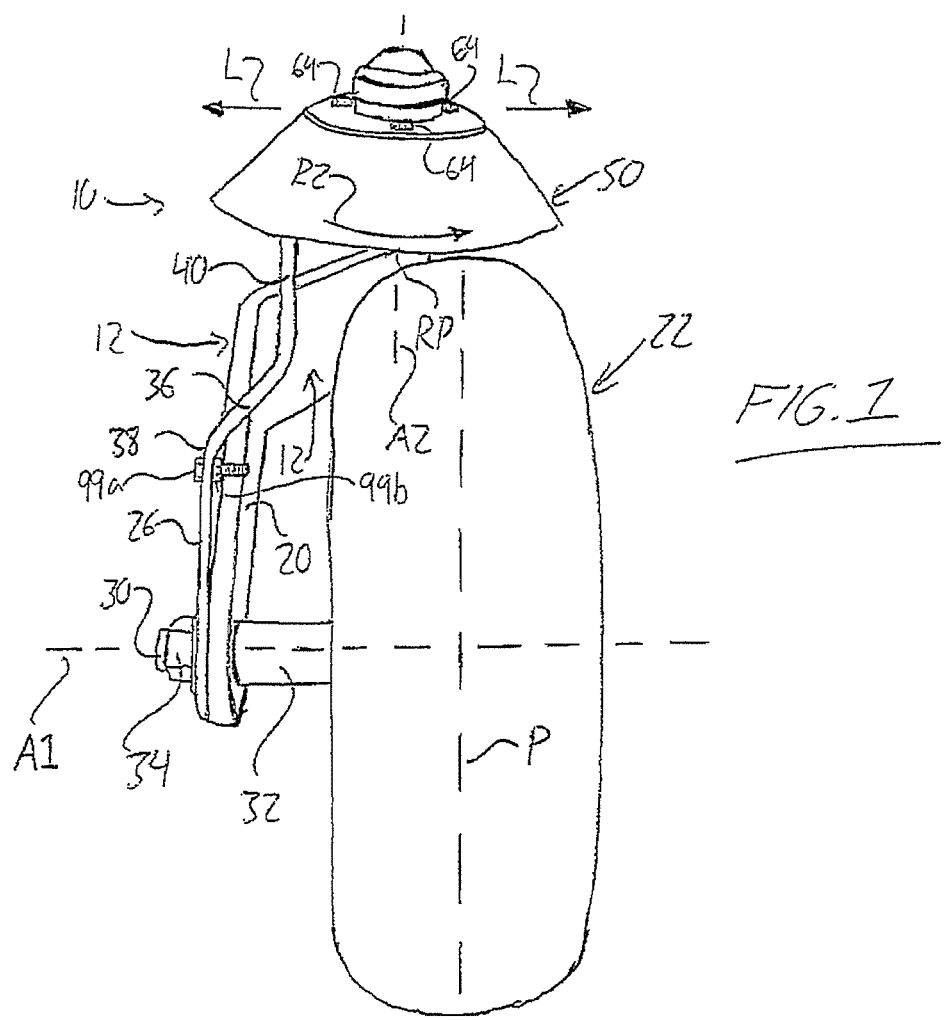

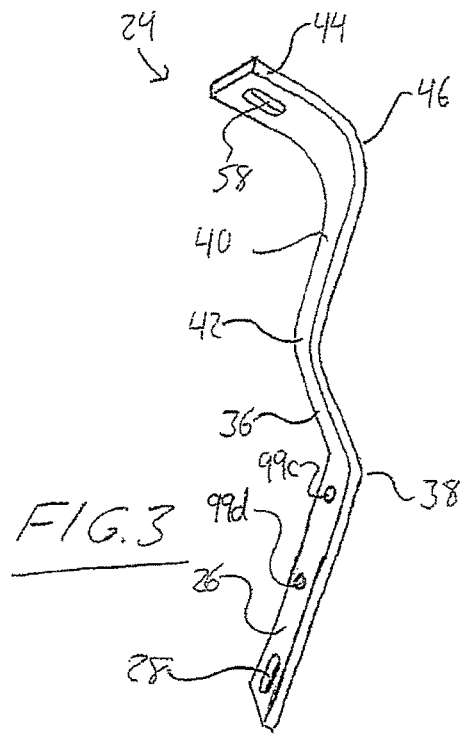
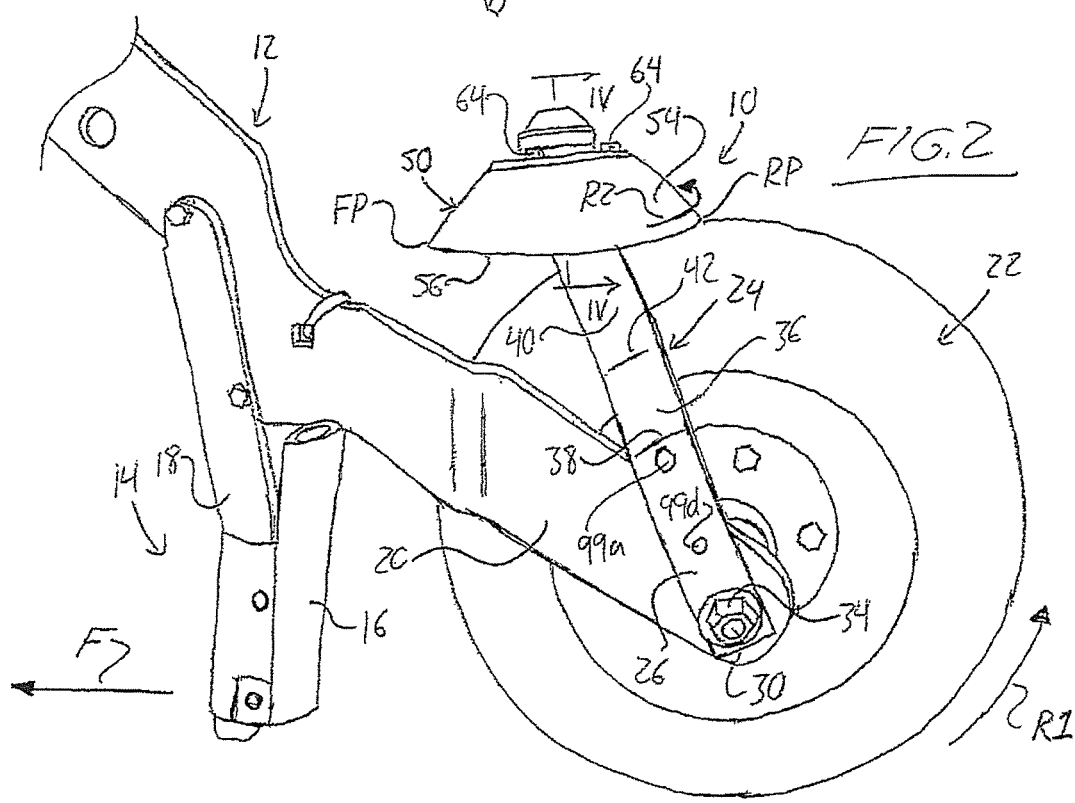

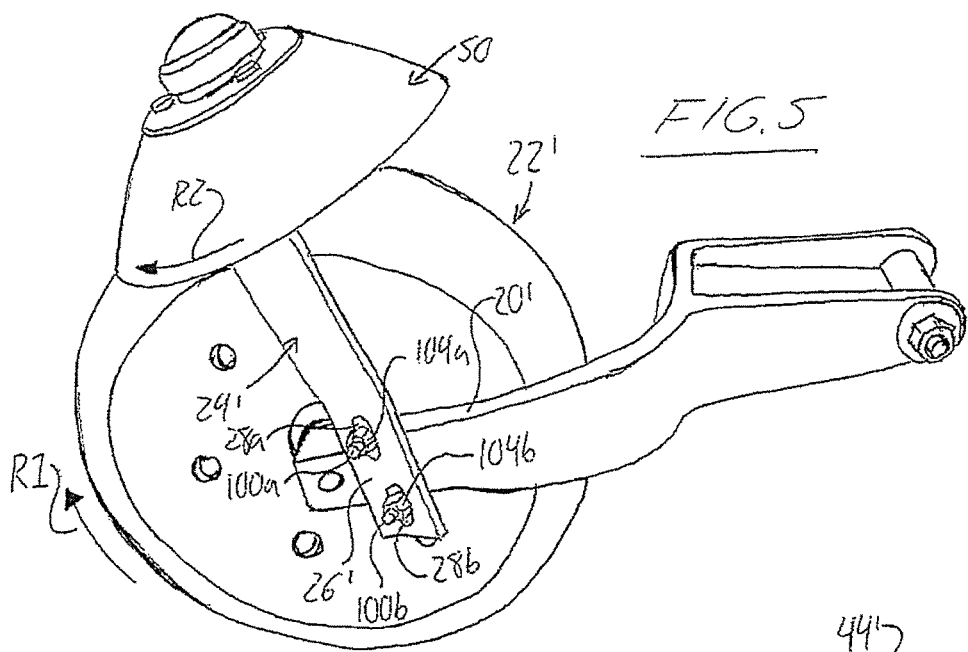
FIG.5
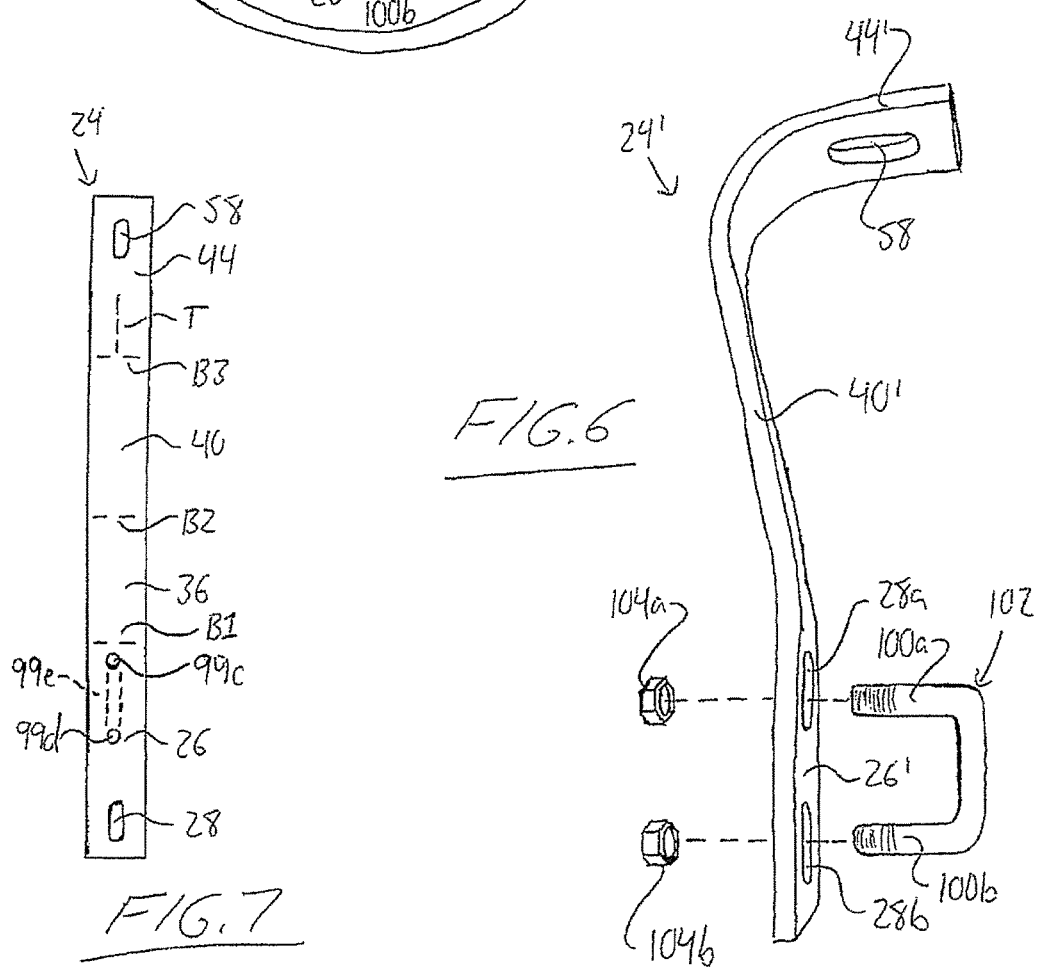
FIG.6
FIG.7

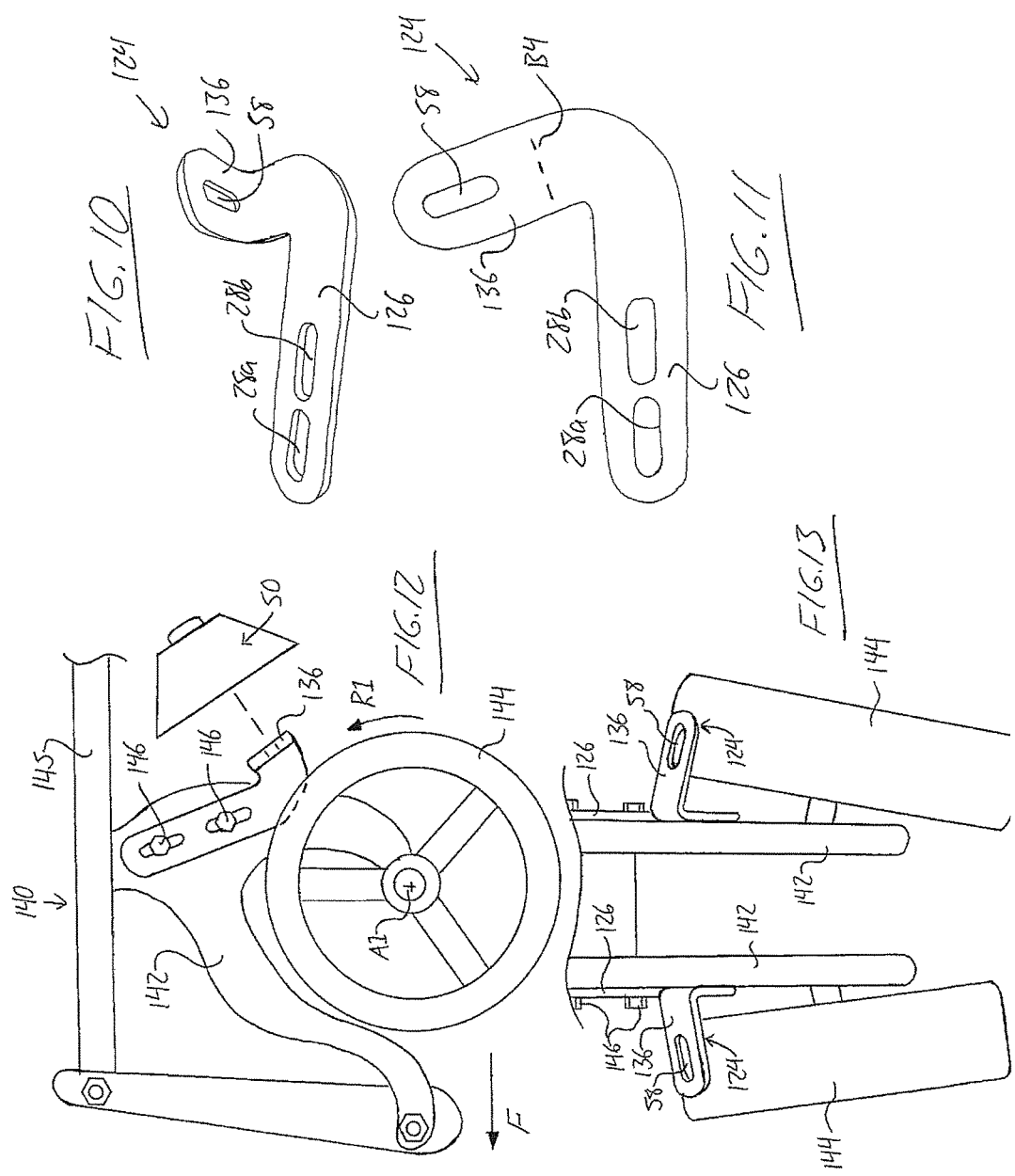

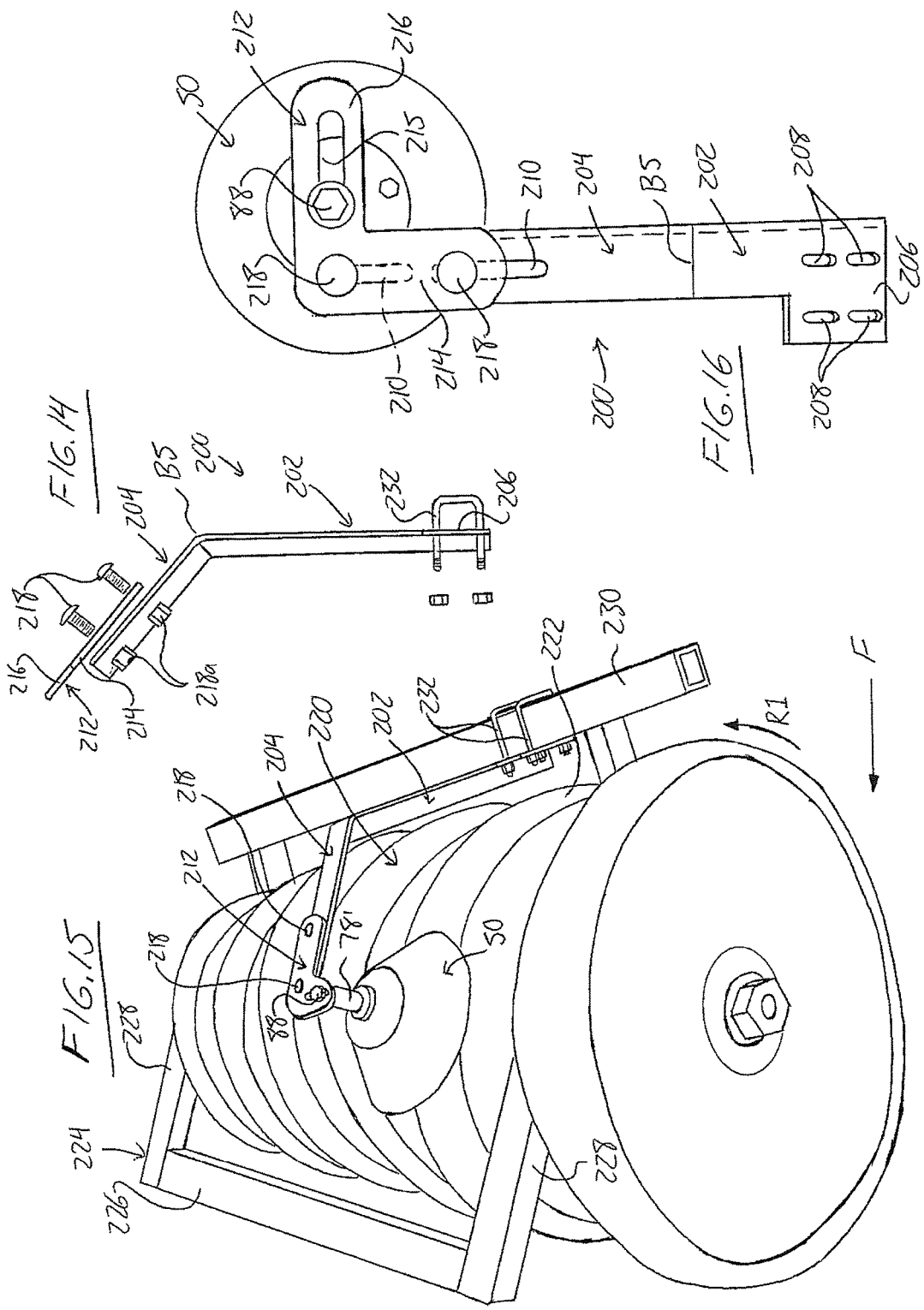

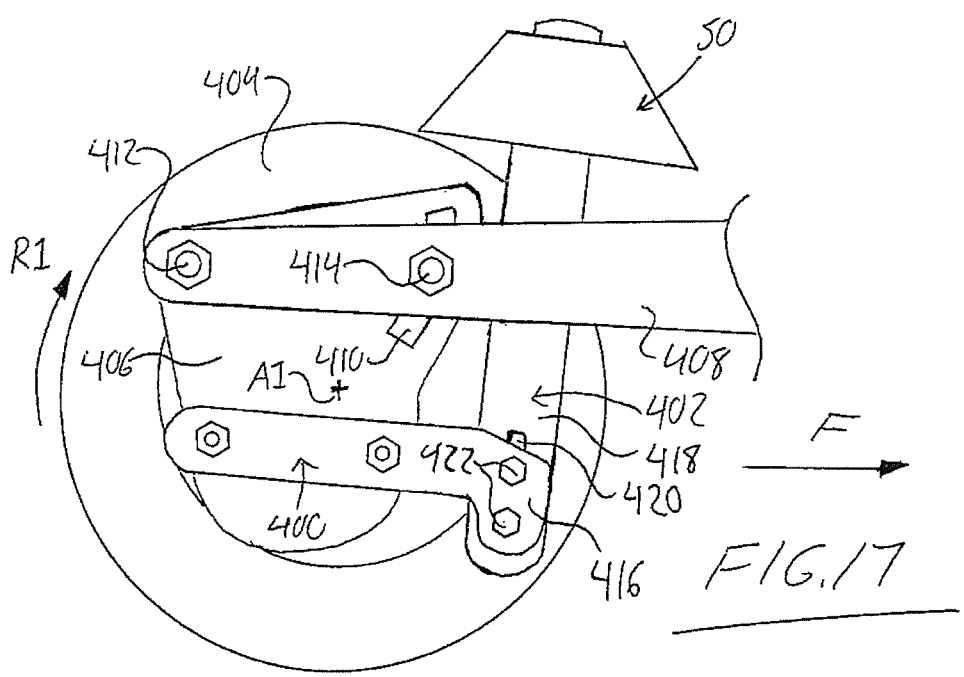

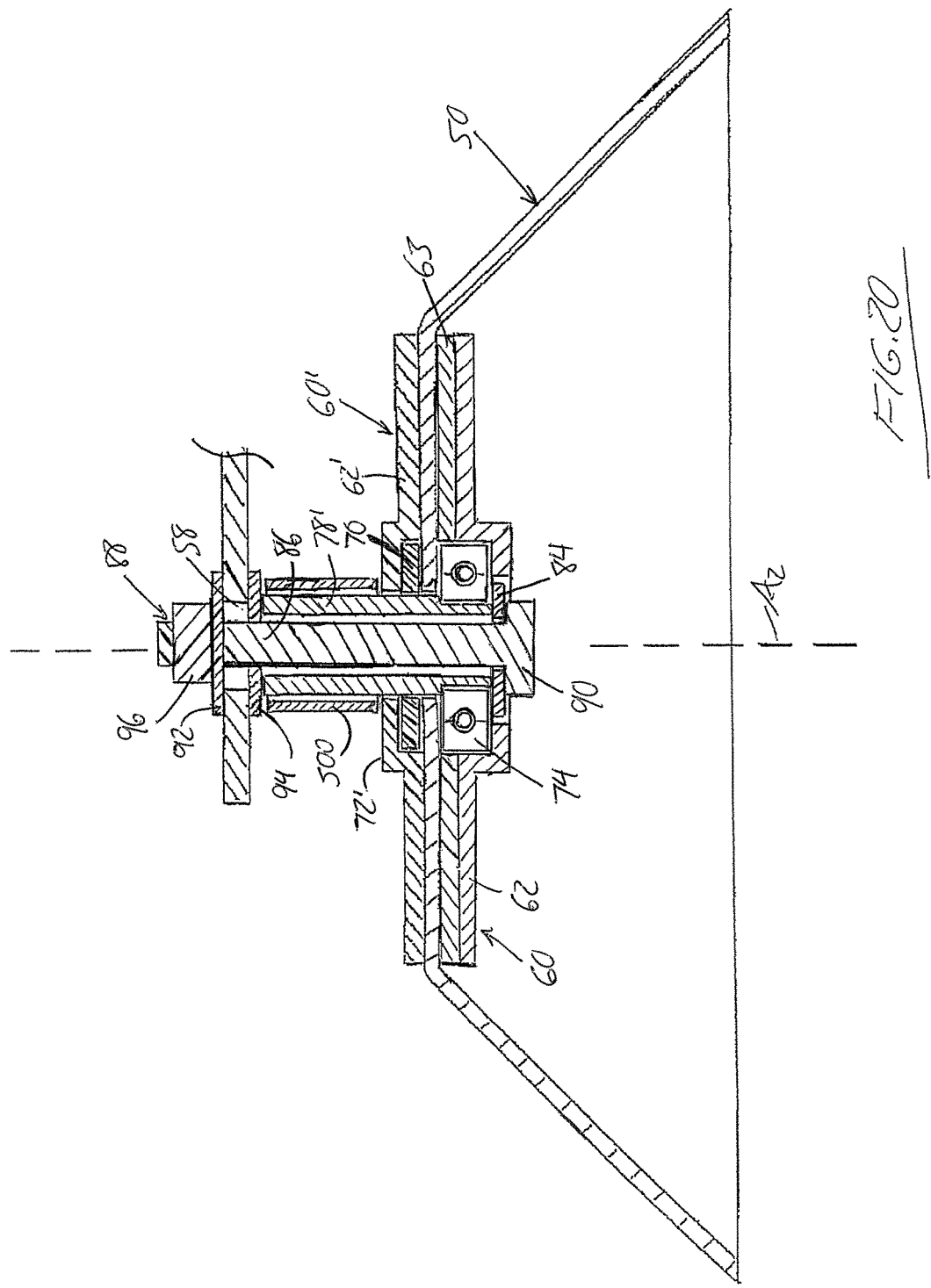

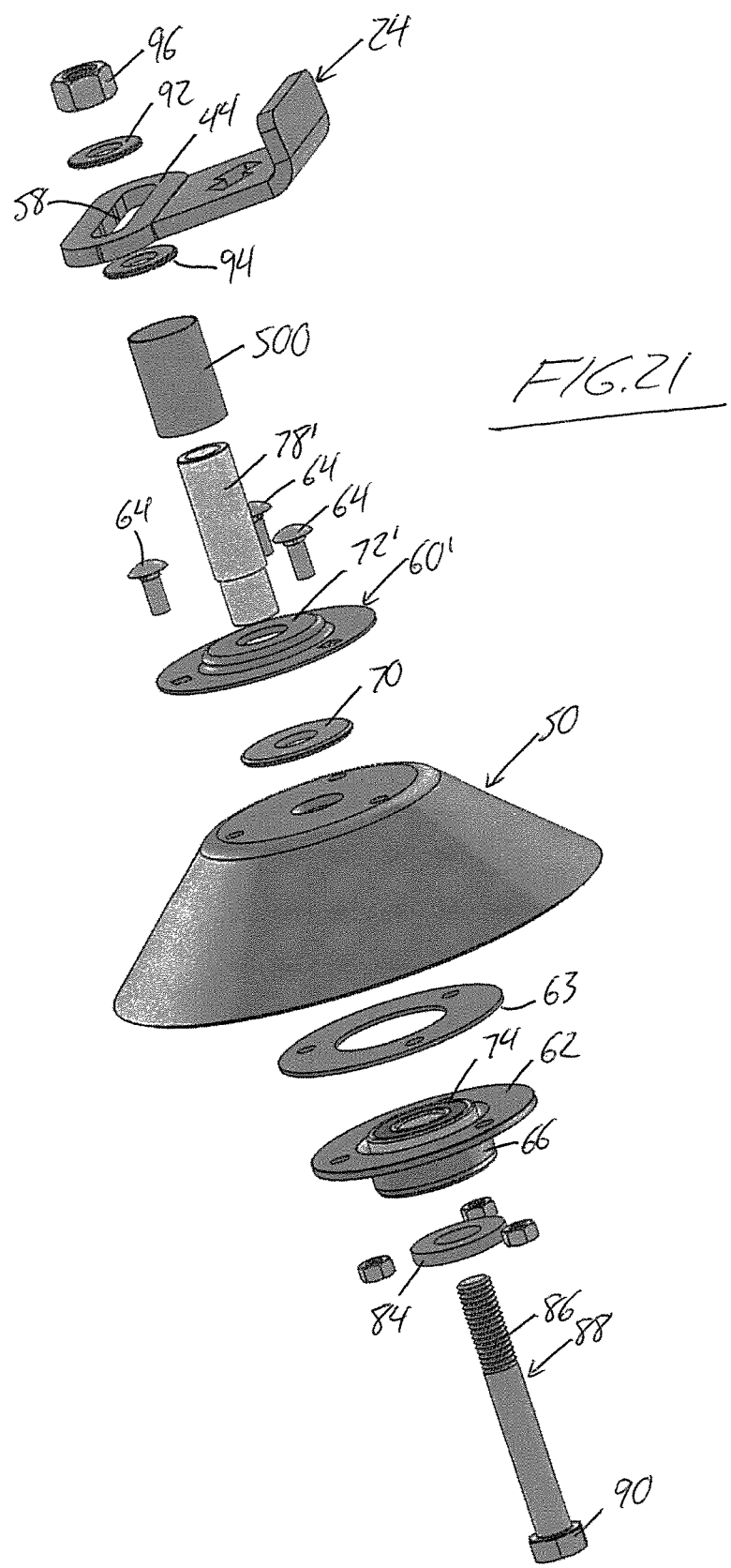

100,130,027 B2

WHEEL OR DISC SCRAPER AND AGRICULTURAL IMPLEMENT FEATURING SAME

CROSS REFERENCE TO RELATED APPLICATIONS

This application is a continuation-in-part of U.S. Non-provisional patent application Ser. No. 14/378,523, which is the national stage of PCT/CA2013/050115 filed Feb. 14, 2013, which in turn claims benefit under 35 U.S.C. 119(e) of U.S. Provisional Application Ser. No. 61/598,639, filed Feb. 14, 2012.

FIELD OF THE INVENTION

The present invention relates generally to agricultural implements, and more particularly to scrapers used to clean mud or the like from ground-engaging wheels or discs of the implement.

BACKGROUND OF THE INVENTION

In the field of agriculture, it is known to employ a scraper to clear mud or other build up material from wheels or discs of an implement.

U.S. Pat. No. 2,454,002 of Paluck and U.S. Pat. No. 2,770,469 of Seda teach wheel scraping mechanisms that employ rotatably-mounted disc-shaped scrapers to clear mud from the ground engaging wheels that carry the overall frame of an agricultural implement over the ground.

U.S. Pat. No. 2,571,285 of Oehler teaches the use of non-rotating blades to clean mud from the packer wheels of a seeding implement.

U.S. Pat. No. 523,508 of Bauer et al., U.S. Pat. No. 975,577 of Shackelford, U.S. Pat. No. 1,260,752 of Casaday, U.S. Pat. No. 1,391,593 of Sweeting, U.S. Pat. No. 1,791,462 of Bermel, U.S. Pat. No. 4,669,550 of Sittre and U.S. Pat. No. 7,647,982 of Meidinger teach rotating scrapers for cleaning rotating discs of agricultural implements.

Applicant has developed a new scraper design including a number of unique features not shown in the aforementioned prior art.

SUMMARY OF THE INVENTION

According to a first aspect of the invention there is provided a scraper member for cleaning a ground-engaging member of an agricultural implement, the scraper member comprising a bowl-shaped body having a hollow interior bound by frustoconcial peripheral wall flaring outward from a smaller end of said hollow interior bowl-shaped body to an opposing wider end thereof, the bowl-shaped body being arranged for rotatable support thereof adjacent the smaller end of said hollow interior.

Preferably an end of the frustoconical peripheral wall at the larger end of the hollow interior is oriented obliquely to an outer face of the wall at an acute angle to create a sharpened edge where the outer face reaches the end of the peripheral wall.

Preferably there is provided a flange bearing mounted to a flat end wall at the smaller end of the hollow interior of the bowl shaped body.

Preferably an angle at which the frustoconical peripheral wall flares outward from an axis around which said frustonical peripheral wall extends is between thirty (30) and sixty (60) degrees.

Preferably an angle at which the frustoconical peripheral wall flares outward from an axis around which said frustonical peripheral wall extends is between forty (30) and fifty (60) degrees.

Preferably a depth of the hollow interior from the larger end thereof to the smaller end thereof is at least 1.5-inches deep.

Preferably a diameter of the frustoconical wall at the larger end of the hollow interior is at least 6-inches.

In some embodiments, a diameter of the frustoconical wall at the larger end of the hollow interior is no greater than 12-inches.

The scraper is preferably provided in combination with a support arm for carrying the scraper member on the agricultural implement.

The support arm may consist of a single unitary plate-like member extending fully from the mounting end to the carrying end.

The support arm may have a slot-shaped hole passing through the support arm adjacent an opposing carrying end thereof for receipt of a connecting element through said slot shaped hole as part of a rotation-enabling connection rotatably supporting the scraper member on the support arm; wherein an elongated dimension of the slot shaped holes exceeds a diameter of the connection element to allow sliding of the connection element back and forth along said slot shaped hole to reposition a rotational axis of the scraper member relative to the support to adjust a position of the scraper member relative to the ground-engaging member of the implement.

The elongated dimension of the slot shaped opening may extend in a longitudinal direction of the support arm.

The support arm may be twisted at one or more locations between the mounting and carrying portions to situate the carrying portion in an oblique orientation relative to the mounting portion about an axis passing therethrough.

The support arm may comprise a series of bends therein arranged to situate the mounting end of the support arm radially outward from the periphery of the bowl shaped scraper member with the carrying end fastened in place inside the bowl shaped scraper member.

In one embodiment, the support arm may be a single, unitary, integral body arranged for direct fastening to the frame by one or more mounting fasteners at a mounting end of the support arm and having an opposing carrying end adapted to carry the scraper member in a position with a rotational axis of the scraper member passing through the support arm adjacent the carrying end of the support arm, whereby the support arm is arranged to carry the bowl-shaped scraping member without assembly of further intermediaries with the support arm between the mounting fasteners and the pivot axis.

In another embodiment, the support arm may be accompanied by a second support having a first end connectable to the support arm adjacent the carrying end thereof, a second end distal to the first end, and a first slot-shaped hole passing through the second support adjacent second end thereof for receipt of a connecting element through said first slot shaped hole as part of a rotation-enabling connection rotatably supporting the scraper member on the second support, the first slot shaped hole having a first elongated dimension that exceeds a diameter of the connection element to allow sliding of the connection element back and forth along said slot shaped hole to reposition a rotational axis of the scraper member relative to the second support to adjust a position of the scraper member relative to the ground-engaging member of the implement; a fastener for coupling the second support to the support arm adjacent the carrying end thereof; and a second slot shaped hole provided in at least one of said support arm and said second support for passage of the fastener through said slot shaped hole to couple the second support to the support arm adjacent the carrying end thereof, the second slot shaped hole having a second elongated dimension that exceeds a diameter of the fastener to allow sliding of the fastener back and forth along said second slot shaped hole to reposition the second support relative to the support arm to further adjust the position of the scraper member relative to the ground-engaging member of the implement.

A pivot shaft may pass through the bowl shaped scraper member and the support arm and lie concentrically on the rotational axis of the bowl shaped scraper member.

The mounting end and the carrying end of the support arm each may be rounded.

The mounting end of the support arm may be wider than the carrying end thereof, in which case the support arm may comprise a radiused increase in width moving toward the wider mounting end of the support.

A stop member may project from the support arm to a side thereof on which the frame member is located when the support arm is clamped against the face of said frame member, at a position where the stop member will block rotation of the support arm in a predetermined rotational direction about an axis passing through said face of the frame member.

The stop member may be removably mounted on the support arm, and may be relocatable to different positions along the support arm.

According to a second aspect of the invention there is provided a method of producing a scraper member for cleaning a ground-engaging member of an agricultural implement, the method comprising pressing a circular disc of metal plate into a bowl-shaped member having a flat end wall formed by a central portion of the circular disc and a frustoconical peripheral wall formed by a remainder of the central disc having been bent relative to the central portion to flare outwardly therefrom to one side thereof.

Preferably the method includes creating an acute angle at a perimeter edge of the disc in order to provide a sharpened scraping edge at an end of the peripheral wall opposite the flat end wall.

According to a third aspect of the invention there is provided an agricultural implement comprising:
 a frame;
 at least one ground-engaging member rotatably coupled to the frame for rotation about a rotational axis of said ground-engaging member;
 a support arm having a mounting end mounted to the frame and an opposing carrying end; and
 a bowl-shaped scraping member rotatably carried on the support arm adjacent the carrying end thereof in a position to scrape buildup from the ground-engaging member;
 wherein the support arm is a single, unitary, integral body directly fastened to the frame by one or more mounting fasteners at a mounting end of the support arm and having a rotational axis of the bowl-shaped member pass through the support arm adjacent an opposing carrying end of the support arm, whereby the support arm carries the bowl-shaped scraping member without assembly of further intermediaries with the support arm between the mounting fasteners and the pivot shaft.

According to a fourth aspect of the invention there is provided scraper for cleaning a ground-engaging member of an agricultural implement, the wheel scraper comprising:
 a bowl shaped scraper member;
 a support arm being arranged for attachment to the implement adjacent a mounting end of the support arm and having an opposing carrying end;
 a second support having a first end connectable to the support arm adjacent the carrying end thereof, a second end distal to the first end, and a first slot-shaped hole passing through the second support adjacent second end thereof for receipt of a connecting element through said first slot shaped hole as part of a rotation-enabling connection rotatably supporting the scraper member on the second support, the first slot shaped hole having a first elongated dimension that exceeds a diameter of the connection element to allow sliding of the connection element back and forth along said slot shaped hole to reposition a rotational axis of the scraper member relative to the second support to adjust a position of the scraper member relative to the ground-engaging member of the implement;
 a fastener for coupling the second support to the support arm adjacent the carrying end thereof;
 a second slot shaped hole provided in at least one of said support arm and said second support for passage of the fastener through said slot shaped hole to couple the second support to the support arm adjacent the carrying end thereof, the second slot shaped hole having a second elongated dimension that exceeds a diameter of the fastener to allow sliding of the fastener back and forth along said second slot shaped hole to reposition the second support relative to the support arm to further adjust the position of the scraper member relative to the ground-engaging member of the implement.

The first and second slot shaped holes may be elongated in non-matching directions.

The non-matching directions may be perpendicular to one another.

The first and second slot shaped holes may be in parallel planes in some embodiments, or in non-parallel planes in other embodiments.

The second slot shaped hole may be provided in the second support.

According to a fifth aspect of the invention there is provided scraper for cleaning a ground-engaging member of an agricultural implement, the wheel scraper comprising:
 a bowl shaped scraper member;
 a support arm being arranged for attachment to the implement adjacent a mounting end of the support arm and having a slot-shaped hole passing through the support arm adjacent an opposing carrying end thereof for receipt of a connecting element through said slot shaped hole as part of a rotation-enabling connection rotatably supporting the scraper member on the support arm;
 wherein an elongated dimension of the slot shaped holes exceeds a diameter of the connection element to allow sliding of the connection element back and forth along said slot shaped hole to reposition a rotational axis of the scraper member relative to the support to adjust a position of the scraper member relative to the ground-engaging member of the implement.

The rotation-enabling connection comprises an intermediate support for fastening between the support arm and the scraper member, the intermediate support having a first fastening hole for fastening of the intermediate support to the support arm through the slot-shaped hole and having a second slot-shaped hole for fastening of the scraper member to the intermediate support through said second slot-shaped hole, the slot shaped hole in the support arm and the second slot shaped hole in the intermediate support being elongated in different directions.

According to a sixth aspect of the invention there is provided agricultural implement comprising:

a frame;

at least one ground-engaging member rotatably coupled to the frame for rotation about a rotational axis of said ground-engaging member;

a support arm having a mounting end mounted to the frame and an opposing carrying end; and a bowl-shaped scraping member rotatably carried on the support arm adjacent the carrying end thereof in a position to scrape buildup from the ground-engaging member;

wherein the support arm has a slot-shaped hole passing therethrough adjacent the carrying end thereof and a connection element extends through said hole as part of a rotatable connection of the bowl shaped scraping member to the support arm, whereby sliding of the connection element back and forth along an elongated dimension of slot shaped hole repositions the rotational axis of the scraper member relative to the support to adjust the position of the scraper member relative to the ground-engaging member.

The ground-engaging member may be a ground-engaging wheel, and the scraper positioned to place a smaller end of the bowl-shaped scraper radially outward from a periphery of the ground-engaging wheel, place a rotational axis of the bowl-shaped scraper member laterally outward from a mid-plane of the wheel that lies normal to the rotational axis of the wheel, and face a larger end of the bowl-shaped scraping member toward the ground engaging wheel with a circumferential portion of the larger end of the bowl-shaped scraping member spanning across the mid-plane of the wheel in close proximity to the periphery thereof According to a seventh aspect of the invention there is provided a scraper for cleaning a ground-engaging member of an agricultural implement, the scraper comprising:

a bowl shaped scraper member;

a support arm arranged for attachment to the implement adjacent a mounting end of the support arm, and for rotatably carrying the bowl-shaped scraper member adjacent an opposing carrying end of the support arm in a position to scrape buildup from the ground-engaging member;

wherein the support arm comprises mounting and carrying portions defined adjacent the mounting and carrying ends respectively, the support arm being twisted about a longitudinal axis of the support arm at one or more locations between the mounting and carrying portions to situate the carrying portion in an oblique orientation relative to the mounting portion.

According to an eighth aspect of the invention there is provided agricultural implement comprising:

a frame;

a ground-engaging member rotatably coupled to the frame for rotation about a rotational axis of said ground-engaging member in a predetermined rotational direction under travel of the frame over the ground in a predetermined travel direction;

a support arm having a mounting end mounted to the frame and an opposing carrying end; and a bowl-shaped scraping member rotatably carried on the support arm adjacent the carrying end thereof in a position to scrape buildup from the ground-engaging member;

wherein the support arm comprises mounting and carrying portions defined adjacent the mounting and carrying ends respectively, the support arm being twisted about a longitudinal axis of the support arm at one or more locations between the mounting and carrying portions to situate the carrying portion in an oblique orientation relative to the mounting portion.

According to a ninth aspect of the invention there is provided scraper for cleaning a ground-engaging member of an agricultural implement, the scraper comprising:

a bowl shaped scraper member; and a support arm arranged for attachment to the implement adjacent a mounting end of the support arm, and for rotatably carrying the bowl-shaped scraper member adjacent an opposing carrying end of the support arm in a position to scrape buildup from the ground-engaging member;

wherein the support arm comprises a pair of slot-shaped holes therein adjacent the mounting end of the support arm, said slot-shaped holes being arranged to receive respective legs of a U-bolt for embracing about a frame member of the implement from a side thereof opposite the support arm in order to clamp the support arm to said frame member, and said slot-shaped holes being elongated in a common direction to allow relative sliding between the support arm and the legs of the U-bolt when said U-bolt is loosened to adjust a position of the scraper member relative to the ground-engaging member.

According to a tenth aspect of the invention there is provided agricultural implement comprising:

a frame;

at least one ground-engaging member rotatably coupled to the frame for rotation about a rotational axis of said ground-engaging member;

a support arm having a mounting end mounted to the frame and an opposing carrying end; and a bowl-shaped scraping member rotatably carried on the support arm adjacent the carrying end thereof in a position to scrape buildup from the ground-engaging member;

wherein the support arm comprises a pair of slot-shaped holes therein adjacent mounting end of the support arm, said slot-shaped holes receiving respective legs of a U-bolt that embraces about a member of the frame from a side thereof opposite the support arm in order to clamp the support arm to said member of the frame, and said slot-shaped holes being elongated in a common direction to allow relative sliding between the support arm and the legs of the U-bolt when said U-bolt is loosened to adjust a position of the scraper member relative to the ground-engaging member.

The slot-shaped holes may be spaced apart along a longitudinal dimension of the support arm.

The ground engaging member may be a packer wheel, and the member of the frame to which the support arm may be mounted by the U-bolt is a packer wheel arm to which the packer wheel is rotationally coupled.

According to an eleventh aspect of the invention there is provided scraper for cleaning a ground-engaging member of an agricultural implement, the wheel scraper comprising:

a bowl shaped scraper member;

a support arm having a mounting portion adjacent one end of the support arm for clamping against a face of a frame member of the agricultural implement, and a scraper-carrying portion defined adjacent an opposing end of the support arm for rotatably carrying the bowl shaped scraper member; and a stop member projecting from the support arm to a side thereof on which the frame member is located when the support arm is clamped against the face of said frame member at a position where the stop member will block rotation of the support arm in a predetermined rotational direction about an axis passing through said face of the frame member.

According to a twelfth aspect of the invention there is provided agricultural implement comprising:

a frame;

at least one ground-engaging member rotatably coupled to the frame for rotation about a rotational axis of said ground-engaging member;

a support arm having a mounting portion mounted to a frame member of the frame adjacent one end of the support arm and a carrying portion defined adjacent an opposing end of the support arm, the mounting portion being clamped against a face of said frame member; and a bowl-shaped scraping member rotatably carried on the support arm at the carrying portion thereof in a position to scrape buildup from the ground-engaging member; and a stop member projecting from the support arm to a side thereof on which the frame member is located at a position where the stop member will block rotation of the support arm in a predetermined rotational direction about an axis passing through said face of the frame member.

According to another aspect of the invention, there is provided a scraper assembly for cleaning a ground-engaging member of an agricultural implement, said assembly comprising:

a bowl-shaped scraper having a hollow interior that is bound by a peripheral wall and is closed at one end by an end wall;

a support arm having a mounting portion configured for attachment to said agricultural implement and a bowl-carrying portion arranged to reside outside said hollow interior of the bowl-shaped scraper;

a bearing having an outer race and an inner race, said outer race being attached or attachable to the end-wall of the bowl-shaped scraper;

a bushing fastened or fastenable between said mounting portion of the support arm and said inner race of the bearing to carry the bowl-shaped scraper on said bushing in a manner rotatable about said bushing at an axial distance from the bowl-carrying portion of the mounting arm; and a protective sleeve received or receivable in a position spaced axially from the bearing and spanning around a portion of the bushing that resides outside the bearing between the end-wall of the bowl-shaped scraper and the bowl-carrying portion of the support arm, said protective sleeve being freely rotatable around said bushing separately and independently of the bearing.

According to another aspect of the invention, there is provided an agricultural implement comprising:

a frame;

at least one ground-engaging member rotatably coupled to the frame for rotation about a rotational axis of said ground-engaging member;

a bowl-shaped scraper having a hollow interior that is bound by a peripheral wall and is closed at one end by an end wall;

a support arm having a mounting portion attached to said frame and a bowl-carrying portion residing outside said hollow interior of the bowl-shaped scraper;

a bearing having an outer race and an inner race, said outer race being attached to the end-wall of the bowl-shaped scraper;

a bushing fastened between said mounting portion of the support arm and said inner race of the bearing to carry the bowl-shaped scraper on said bushing in a manner rotatable about said bushing at an axial distance from the bowl-carrying portion of the mounting arm; and a protective sleeve received in a position spaced axially from the bearing and spanning around a portion of the bushing that resides outside the bearing between the end-wall of the bowl-shaped scraper and the bowl-carrying portion of the support arm, said protective sleeve being freely rotatable around said bushing separately and independently of the bearing.

BRIEF DESCRIPTION OF THE DRAWINGS

In the accompanying drawings, which illustrate exemplary embodiments of the present invention:

FIG. 1 is a rear, overhead perspective view of a first embodiment trailing arm assembly of a seeding implement, featuring a bowl-shaped scraper rotatably supported near the periphery of a packer wheel rotatably mounted at a rear end of the trailing arm.

FIG. 2 is side perspective view of the first embodiment trailing arm assembly of FIG. 1.

FIG. 3 is a front, side perspective view of a scraper-carrying support arm of the first embodiment trailing arm assembly of FIGS. 1 and 2.

FIG. 5 is a side, overhead perspective view of a second embodiment trailing arm assembly.

FIG. 6 is an exploded front, side perspective view of the scraper-carrying support arm of the second embodiment trailing arm assembly of FIG. 5 with a U-bolt used to secure the support arm to the trailing arm of the agricultural implement.

FIG. 7 is an overhead plan view of a strip of material used to produce the support arm of the first embodiment, at an intermediate stage during production thereof.

FIG. 10 is a perspective view of a fourth embodiment support arm for carrying the bowl shaped scraper on another type of packer wheel assembly on an agricultural implement.

FIG. 11 is a plan view of a strip of material used to produce the support arm of the fourth embodiment, at an intermediate stage during production thereof.

FIG. 12 is a schematic side elevational view of a packer wheel assembly having the fourth embodiment support arm installed over each of two packer wheels of the assembly, and illustrating assembly of bowl-shaped scrapers on the support arms.

FIG. 13 is a schematic rear elevational view of the packer wheel assembly of FIG. 12 with the scrapers omitted to clearly show the support arms.

FIG. 14 is an exploded view of a two-piece support arm assembly of a fifth embodiment for carrying the bowl shaped scraper on another type of packer wheel assembly on an agricultural implement.

FIG. 15 is a schematic perspective view of the fifth embodiment support arm assembly installed on a gang of packer wheels to carry a respective bowl shaped scraper over one wheel of the gang.

FIG. 16 is an overhead view of an arm assembly and scraper of the same type as FIG. 15.

FIG. 17 is a schematic side elevational view of a sixth embodiment scraper assembly installed on another type of packer wheel assembly.

FIG. 20 is a partial cross-sectional view of a bowl-shaped scraper and scraper-carrying support arm, as viewed in the same cross-sectional plane as FIG. 4, but illustrating an alternate configuration of the rotational connection between the scraper and support arm.

FIG. 21 is an exploded view of the scraper and support arm of FIG. 20.

DETAILED DESCRIPTION

Figure 4:
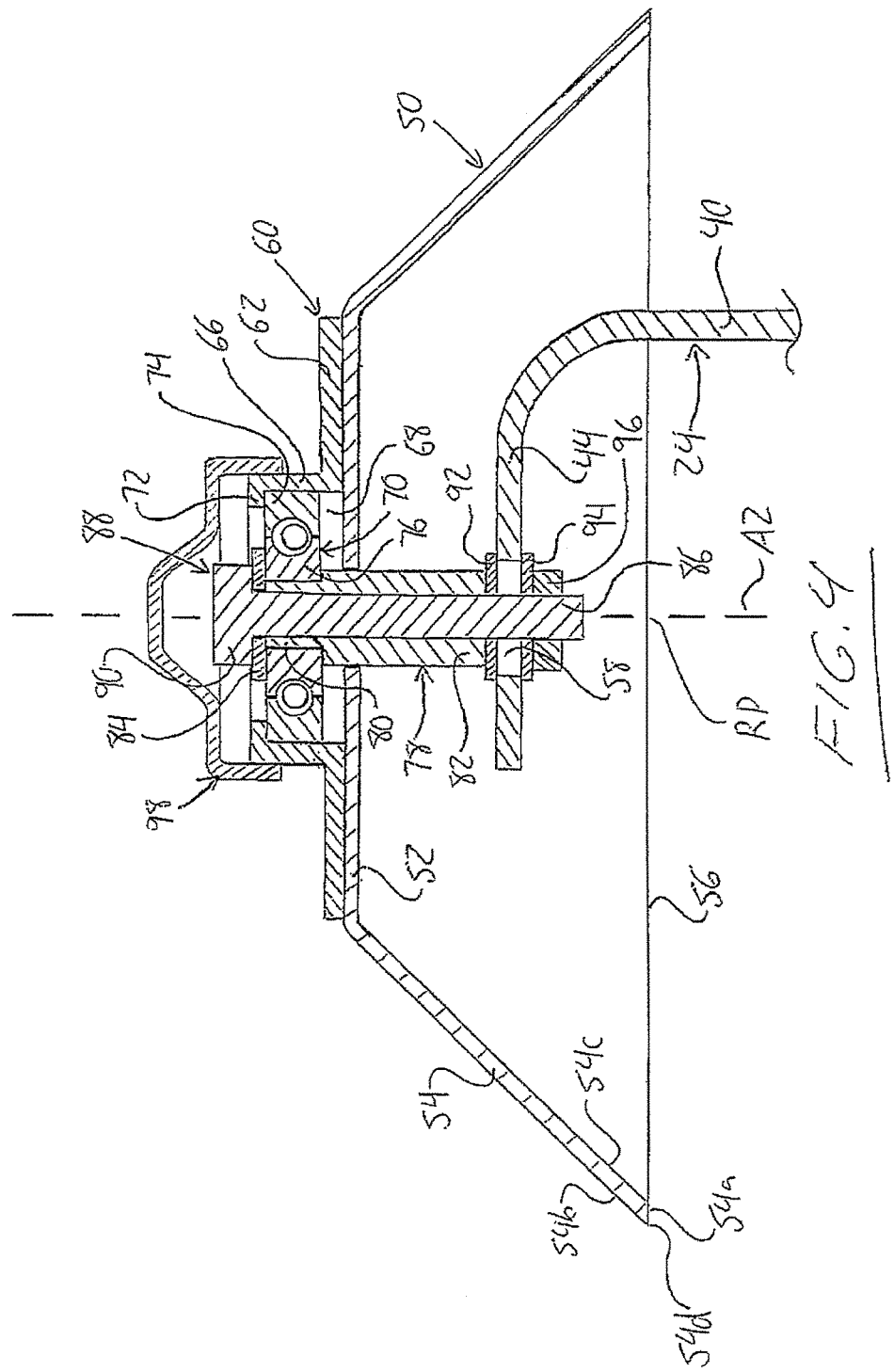
FIG. 4 is a partial cross-sectional view of bowl-shaped scraper and scraper-carrying support arm of FIG. 2 as taken along line IV-IV thereof.

FIGS. 1 to 4 illustrate a first embodiment of the present invention, featuring a mud scraper 10 mounted on a trailing arm 12 of an agricultural implement. In a known manner, the trailing arm 12 has a leading end thereof connected to a transverse tool bar of the implement frame that lies horizontally perpendicular to a longitudinal axis of the implement frame so that the trailing arm 12 trails behind the tool bar when the implement is conveyed in a forward direction F, for example as pulled by tractor coupled to a front end of the implement by a suitable hitch connection. The trailing arm 12 has at least one furrow opener 14 mounted thereon at an intermediate location between its leading and trailing ends to depend downward from the trailing arm into the ground therebeneath to create a furrow in the earth as the trailing arm is pulled along. The illustrated embodiment features a delivery tube 16 mounted immediately behind a shank 18 of the furrow opener to allow delivery of granular product, such as seed or fertilizer, through the tube 16 into the furrow formed by the opener 14. A packer wheel arm 20 extends rearwardly from the intermediate portion of the trailing arm on which the opener is mounted, in order to carry a packer wheel 22 in a rotatable manner near the rear end of the packer wheel arm 20 in a position aligned with the furrow opener to follow therebehind to pack the displaced soil back in place over the furrow created by the opener.

The inventive mud scraper 10, described in greater detail below, is arranged to clean mud from the packer wheel 22 as the same rotates during travel of the implement in the forward direction.

While the illustrated embodiment is shown in use on an implement featuring a shank-style opener with a furrow forming tool carried at a lower end of the shank, and a packer wheel arm that is an integral extension of a unitary trailing arm, it will be appreciated from the following description that the mud scraper 10 of the present invention may be used on various types and styles of implements with packer wheels or other ground-engaging wheels, regardless of particular furrow opener and trailing arm types.

The mud scraper features a support arm 24 mounted to the packer wheel arm 20 on the side thereof facing laterally away from the packer wheel 22. The support arm 24 has an elongated shape, having been formed from an initially flat, rectangular piece of metal plate having a length that significantly exceeds its width. The metal plate is bent at three locations spaced apart along its length about respective transverse axes lying perpendicular to its lengthwise dimension, thereby dividing the plate into four distinct sections, each defining a respective lengthwise portion of the resulting support arm or bracket. A first mounting portion 26 is flat in order to sit flush against the flat face of the packer wheel support arm 20 facing away from the packer wheel 22. A first through-hole 28 in the support arm 24 is defined in the mounting portion 26 adjacent the respective end of the support arm 24 defined by the mounting portion 26, as best shown in FIG. 3. The first hole 28 is situated at the rotational axis of the packer wheel 22 so that the shaft of an axle bolt 30 passing through the wheel axle 32 and packer wheel arm 20 also extends onward through the mounting portion 26 of the support arm 24 to the side thereof opposite the packer wheel, so that the nut 34 threaded onto the axle bolt 30 on this side of the support arm not only contributes in a conventional manner to the rotational support of the packer wheel 22 on the packer wheel arm, but additionally holds the support arm 24 in place on the packer wheel arm 20 by clamping the mounting portion 26 of the support arm 24 against the packer wheel support arm 20. The mounting portion 26 of the support arm 24 is longer than it is wide, and its length extends radially relative to the rotational axis of the packer wheel 22 and reaches a position outward from the packer wheel arm 20.

A second transitional portion 36 of the unitary support arm 24 extends integrally from the mounting portion, but deviates from the plane of the mounting portion, which lies normal to the wheel's rotational axis. From this bend 38 in the support arm, the transitional portion 36 angles obliquely from the mounting portion 24 to slope toward the wheel, and is long enough to transition from the side of the packer wheel arm 20 on which the support arm is attached, to the other side of the packer wheel arm 20 facing the packer wheel 22. The length and slope of the transitional portion 36 is insufficient to reach the wheel itself, instead stopping short of contact therewith.

Here, a spaced a short distance laterally from the wheel, a third extension portion 40 of the support arm 24 extends integrally from the transitional portion 36, but deviates from the plane of the transitioning portion in order to lie parallel to the mounting portion 26. From this bend 42 in the support arm 24, the extension portion 40 thus lies in a plane normal to the wheel axis, and extends further away therefrom in the same radial direction as the mounting portion 26. The length of the extension portion 40 is sufficient to reach a radial distance outward past the periphery or circumference of the packer wheel 22.

As shown in FIGS. 3 and 4, a fourth scraper-carrying portion 44 of the support arm extends integrally from the transitional portion extension portion 40, but deviates from the plane of the extension portion. The support arm 24 is bent by ninety degrees about a transverse axis to define this corner 46 between of the third and fourth portions 40, 44, but is also twisted about the longitudinal axis of the plate-like support arm at this corner by an acute, oblique angle. That is, the scraper-carrying portion 44 of the support arm 24 does not lie in a plane perpendicular to that of the extension portion 40, but rather is tilted out of a plane normal to the wheel axis by an acute, oblique angle about an axis parallel to the wheel axis. The direction of the support arm twist producing this tilted orientation of the scraper carrying portion 44 is in a direction about the twist axis that is opposite the rotational direction R1 of the packer wheel 22 about the wheel axis during movement of the implement frame in the forward direction F.

A bowl-shaped scraper member 50 is rotatably supported on the scraper-carrying portion 44 of the support arm in a manner allowing rotation of the scraper member 50 about an axis that perpendicularly intersects the plane of the flat scraper portion 44 of the support arm at a position overlying the periphery of the wheel, but offset from the wheel's vertical mid-plane P that lies normal to the wheel's horizontal rotation axis A1. The bowl-shaped member 50 is oriented to open toward the wheel 22 with the support arm 24 extending inside the interior space of its bowl-shape to situate the scraper carrying portion 44 of the support arm parallel to the closed end 52 of the bowl-shaped member at a position inside the frustoconical peripheral wall 54 of the bowl-shaped member at an intermediate location between the smaller-diameter closed end 52 thereof and the larger diameter open end 56 closer to the periphery of the wheel 22. The diameter of the larger open end 56 of the bowl 50 spans from a position laterally outward from the wheel on the side the support arm 24 opposite the wheel and reaches over the wheel, past the mid-plane P thereof, preferably spanning the full width, or nearly the full width, of the wheel.

In the illustrated embodiment where the obliquely-oriented support arm extends upward, the oblique tilt of the scraper carrying portion 44 of the support arm 24 out of the tangential plane at the support arm's radial position relative to the wheel axis A1 acts to position the rearmost point RP of the circular path of the circumference of the larger end of the rotatable bowl closer to the periphery of the wheel 22 than the diametrically opposite forwardmost point FP of the circular path. That is, the plane of the bowl's open end grows further away from the periphery of the wheel as you move along this plane in the forward direction F in which the implement is pulled. The rearmost point RP defines a point on the rotational path of the bowl's open end that trails the opposing forwardmost point FP in the wheel's direction of rotation R1. In other embodiments, where the support arm does not extend vertically or obliquely upward, for example instead extending horizontally rearward or obliquely downward, the scraper bowl would still be oriented to situate the trailing point RP of the rotational path of the bowl's open end closer to the wheel periphery than the opposing leading point FP of the bowl's rotational path, again using the term's leading and trailing in relation to the rotational direction R1 of the packer wheel 22.

Referring to FIG. 2, as the packer wheel 22 picks up mud at the point of contact with the ground, the mud is carried around the wheel axis under the wheel's rotation until it reaches the bowl 50, where the circumferential edge joining the outer surface of the bowl's peripheral wall 54 to the annular rim surface forming the boundary of the bowl's larger open end is situated close to the periphery of the wheel and acts to peel or cut away at least an outer portion of the mud deposit. The peeled mud can ride up the outer surface of the bowl's peripheral wall 54, and because the rotational axis A2 of the bowl 50 is laterally offset from the mid-lane P of the wheel, the impact of mud at the wheel's midplane against the bowl imparts a rotational movement to the bowl in a predetermined direction R2 that carries the peeled-away mud toward the side of the packer wheel 22 opposite the support arm, where the mud can slide down the sloped outer surface of the bowl's periphery and fall to the ground. The position of the bowl thus performs a cleaning action on the packer wheel, while cooperating with the rotational mounting of the bowl to provide to a self-cleaning functionality of the scraper. The bowl thus separates deposited mud from the packer wheel, conveys the mud away from the packer wheel, and then sheds the mud off itself, thus clearing that portion of the bowl circumference before its rotational path comes back around for a second pass across the wheel.

FIG. 4 illustrates the rotational connection between the bowl 50 and the support arm 24. The support arm features a second through hole 58 at the scraper-carrying portion 44. The flat, closed end 52 of the bowl features a centrally positioned through hole therein. On the outer face of the closed end 52 of the bowl, a flanged bearing housing 60 features a flat annular outer flange 62 seated flush atop the closed end 52 of the bowl and secured thereto, for example by bolts 64 engaged with threaded holes in the end of the bowl or nuts inside the bowl, and a cylindrical wall 66 projecting perpendicularly from the outer flange 62 at the inner periphery thereof to bound an interior space 68 of the housing 60 which contains a bearing 70. At the top end of its cylindrical wall 66, the housing features an annular inner flange or lip 72 projecting inward from the cylindrical wall by a short distance in order to overlie an outer race 74 of the bearing 70 without reaching the inner race 76 thereof. A sleeve or bushing 78 with a stepped outer-diameter has a smaller diameter portion 80 of its two different-diameter portions received within the opening bound by the annular inner race 76 within the interior space 68 of the bearing housing on the exterior side of the bowl's closed end 52. Immediately beneath the bearing 70, the outer diameter of the sleeve or bushing 78 steps outward to underlie the inner race 76 of the bearing without reaching the outer race 74 thereof. This larger diameter portion 82 of the sleeve or bushing 78 extends through the central hole in the closed end 52 of the bowl 50 into the interior thereof.

Seated atop the bearing is a first washer 84 having its opening in communication with the cylindrical inner bore of the sleeve or bushing 78. The shaft 86 of a bolt 88 extends through the bore of the sleeve or bushing 78 from outside the bowl 50, thus seating the head 90 of the bolt 88 atop the first washer. From the larger diameter end of the sleeve or bushing 78, the shaft 86 of the bolt passes through a second washer 92, the second through hole 58 of the support arm 24, a third washer 94, and a nut 96 threaded onto the bolt shaft 86, in that order. The nut and bolt are shown schematically without threading for ease of illustration. The nut 96 is tightened, thereby clamping the support arm 24 between the second and third washers 92, 94, clamping the sleeve or bushing 78 between the first and second washers 84, 92, clamping the first washer 84 against the inner race 76 of the bearing, and clamping the inner race 76 of the bearing 70 between the first washer and the exterior shoulder of the sleeve or bushing 78 defined by the stepped outer diameter thereof.

The fastening together of the nut and bolt through the bearing and the support arm thus couples the bowl 50 and the support arm 24 together while allowing relative rotation therebetween about the axis A2 of the bolt 88, while the sleeve or bushing 78 acts as a spacer to keep the bowl-carrying portion 44 of the scraper at a distance from the closed end 52 of the bowl. A protective cap 98 is engaged to the cylindrical wall 66 of the flanged bearing housing 60 to close thereover in order to protect the connection components between the bowl and the support arm from exposure to the elements. While other embodiments are possible, as mentioned herein above, having the support arm 24 oriented in an upright orientation acts to position the bowl in a downward-opening orientation, thus cooperating with the cap 98 to provide significant enclosure of the connection components to minimize damage and wear and accordingly minimize the need for, or frequency of, component replacement or service.

As mentioned above, the second through-hole 58 of the support arm 24 is elongated in one direction, particularly in the lengthwise direction of the scraper carrying portion 44 of the support arm. The elongated dimension of this slot-shaped through-hole 58 notable exceeds the diameter of the bolt shaft 86, as shown in FIG. 4, while the width of the hole more closely conforms to the bolt shaft diameter. Accordingly, with the nut 96 in a loosened condition, relative sliding can take place between the bolt shaft 86 and the support arm 24 in the elongated direction of the support arm's through hole 58. This allows the position of the bowl 50 relative to the mid-plane P of the wheel to be adjusted back and forth in a lateral direction, as illustrated by arrows L in FIG. 1, allowing the owner or operator of the implement to set a preferred offset distance between the bowl's rotational axis A2 and the mid-plane P of the wheel for optimum mud-clearing performance of the scraper.

As shown in FIG. 3, the first through-hole 28 of the support arm 24 is also elongated in the longitudinal direction of respective portion of the support arm 24. Accordingly, the first through-hole has a length that notably exceeds its width, which closely, but non-restrictively, conforms to the shaft diameter of the axle bolt 30. This way, with the axle nut 34 loosened, the support can not only be angularly rotated about the wheel axis A1 to set a desired radial direction in which the support arm extends, but can also be slid back and forth along the radial direction to set the radial distance by which the support arm reaches outward from the wheel axis A1, thereby setting how close the arm's scraper-carrying portion is to the periphery of the packer wheel. Accordingly, the owner or operator can adjust how close the bowl 50 is positioned to the wheel periphery in order to optimize the performance of the scraper.

Further adjustment, or an alternative adjustment, of the bowl position relative to the wheel periphery may be accomplished by disassembly of the connection between the support arm and the bowl in order to substitute the sleeve or bushing 78 for one of different length. For example, a shorter sleeve or bushing would hold the closed end of the bowl closer to the bowl-carrying portion 44 of the support arm 24, thus making the open end of the bowl closer to the wheel periphery, while substitution for a longer sleeve or bushing would instead have the opposite effect. Accordingly, it may be possible to use the same support arm shape and dimensions for more than one brand or style of implement, if use of the slot-shaped arm-mounting hole, different bushing/sleeve lengths, or a combination thereof can accomplish suitable bowl-placement for the different implements using the same support arm.

As shown in FIGS. 1 and 2, a bolt 99a is fed through the support arm 24 from the side thereof facing away from the packing wheel 22 to fasten with a nut 99b on the opposite side of the support arm facing the packing wheel 22. The hole 99c for passage of the bolt through the support arm is located in mounting portion 26 near the bend 38 that connects it to the transition portion 36. The bolt thus projects laterally from the support arm 24 toward the wheel just above the packer wheel arm 20, and has a length that crosses fully over the packer wheel arm 20 without reaching the wheel 22 itself. The bolt 99a thus forms a stop member that will block pivoting of the support arm 24 about the wheel axis A1 in the same rotational direction R1 as the packer wheel 22 by abutting against the upper peripheral edge of the packer wheel arm 20. This way, the impact of the mud on the tire against the bowl 50 will not move the bowl from its current position, even if the nut and bolt 34, 30 at not engaged with sufficient tightness to entirely fix the support arm against rotation. Multiple stop member mounting points may be provided, for example as illustrated by additional bolt hole 99d in the mounting portion 26 of the support arm, so that the stop member may be disengaged from one position on the support arm and relocated to another, for example for use of the support arm on different implements compatible with the same shape of support arm, for use of the support in on the same implement by in a different radial orientation relative to the wheel axis. For example, the illustrated stop bolt 99a may be disengaged from nut 99b and relocated from upper hole 99c to lower hole 99d, where the top bolt 99a is suitable for use of the support arm in a more rearwardly angled orientation of the support arm 24 compared to the forwardly tilted orientation thereof in the drawings. As an alternative to multiple holes for the stop bolt 99a, an elongated slot-shaped hole 99e may be used to adjust the stop bolt position on the support arm, as shown in broken lines in FIG. 7.

FIGS. 5 and 6 show a second embodiment that differs from the first in the shape of the support arm and the arrangement for mounting thereof to the packer wheel arm. The support arm 24' again is formed by bending and twisting of an initially flat, rectangular strip of metal plate. However, the support arm 24' has only three flat portions, particularly a mounting portion 26', an intermediate portion 40' and a scraper bowl carrying portion 44'. The second embodiment support arm 24 is for mounting on a packer wheel arm 20' whose outer face that faces away from the packer wheel 22' does not lie in a plane normal to the wheel axis, as the packer wheel arm 20' has a curved configuration that curves or angles inwardly toward the wheel's mid-plane as it extends inwardly past the wheel's periphery toward the axle. Where the packer wheel arm 20' connects to the axle, the outer face of the packer wheel arm is actually axially inward from the outer face of the wheel. Accordingly, the intermediate portion 40' of the support arm 24' bends obliquely from the mounting portion 26' in the direction opposite the first embodiment, i.e. angling away from the wheel 22', so that the scraper carrying portion 44' carried atop the intermediate portion 40' can jut axially inward over the periphery of the wheel from a position a short distance laterally outward therefrom.

A twist about the longitudinal direction of the support arm at a location between the two portions furthest from the mounting portion is present for the same purpose as the first embodiment, i.e. to tilt the scraper bowl 50 to position its trailing circumferential portion closer to the wheel periphery that its leading circumferential portion relative to the rotational direction R1 of the wheel 22'. Comparison of the first and second embodiments demonstrates how differently shaped support arms can employ different numbers and positions of bends to suit particular mounting requirements for different implements, while still employing a twist at one or more locations therealong to achieve a desired, tilted orientation of the bowl-shaped scraper.

The second embodiment also differs from the first in that a single, elongated through hole in the mounting portion of the support arm is replaced with a pair of elongated through holes 28a, 28b in the mounting portion 26'. Each hole 28a, 28b receives a respective leg 100a, 100b of a U-bolt 102 that embraces around the inner side of the packer wheel arm 20' facing the packer wheel so that tightening of nuts 104a, 104b onto the U-bolt legs 100a, 100b above and below the packer wheel arm 20' from the side of the support arm 24' opposite the packer wheel arm 20' and wheel 22' acts to clamp the support arm 24' onto the packer wheel arm at the side thereof opposite the wheel 22'. The use of a U-bolt in this manner allows the present invention to be used on implements that lack the presence of an existing, accessible nut and bolt combination at the wheel axle's mounting point on the packer wheel arm, as was used for mounting of the support arm in the first embodiment. However, by having the U-bolt receiving holes 28a, 28b elongated in the longitudinal dimension of the support arm, the second embodiment retains the ability to loosen the fastening of the support arm to the packer wheel arm and shift the support arm back and forth, through relative sliding between the support arm and fastener along the elongated direction of the holes, in order to adjust the distance by which the support projects outwardly past the periphery of the wheel 22'. The second embodiment support arm 24' also includes the elongation of the hole 58 at the scraper-carrying portion to allow the same lateral adjustment of the bowl as described for the first embodiment.

FIG. 7 shows the first embodiment support arm 24 at an intermediate stage during its fabrication. The piece is a purely rectangular strip of metal, which minimizes waste material when cutting multiple support arm pieces from a larger rectangular sheet or plate of material. The slot-shaped holes 28, 58 are cut or otherwise machined into the strip adjacent the opposite ends thereof. The piece is then bent at three transverse bend lines B1, B2, B3 to divide and twisted about its longitudinal axis at twist line T adjacent bend line B3. The second embodiment is produced in a similar manner, but only needing two bends, instead of three, and replacing the single slot-shaped hole 28 near one end of the strip with a pair of such holes 28a, 28b. The present invention thus provides a simple, cost-effective, single-piece support structure for extending from a suitable mounting point on the implement to a suitable location for rotatably supporting the scraper member.

In addition to this advantage over the more complex support structures employed in the prior art rotatable-disc scrapers, the present invention also employs the unique mounting of a roller-element bearing on a flat-end of a scraper member in place of the bush-type rotational connections of the prior art to provide a smooth, reliable rotational action. Furthermore, the elongated-slot mechanism for adjustment of the scraper member position and the similarly adjustable U-bolt attachment provide simple, elegant solutions to adjustability and adaptability for use on a variety of different implements.

Figure 8:
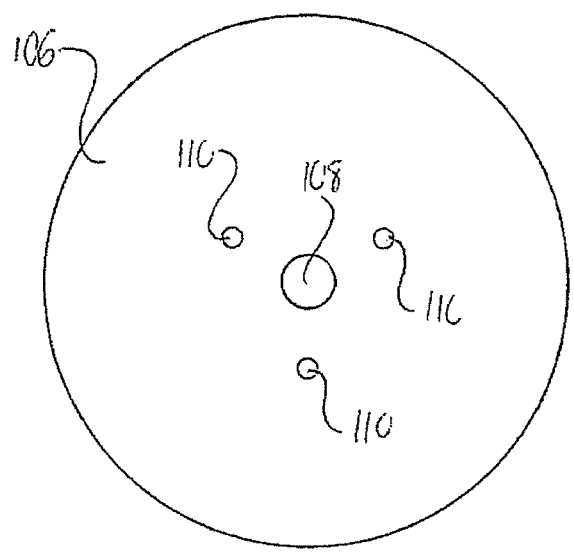
FIG. 8 is an overhead plan view of a circular metal disc used to produce the bowl shaped scraper, at an intermediate stage during production thereof.

With reference to FIG. 8, the bowl-shaped scraper can be produced by pressing of a circular disc 106 of metal plate, for example 10-gauge sheet metal, between frustonically-shaped male and female dies, and drilling or otherwise machining the central hole 108 and any additional holes 110 that may be useful for fastening the flange bearing to the bowl. Particular embodiments produced by the applicant include pressing of 8-inch diameter metal discs into bowls of 7-inch diameter at their larger open ends, and pressing of 10.5-inch metal discs into bowls of 9.5-inch diameter. The bowls have a depth of 1.75 inches from the larger open end of their hollow interiors to the opposing closed end thereof. Other embodiments of varying diameter may be produced, for example with finished sizes of between 6 and 12 inches in bowl diameter in some embodiments, and a smaller or greater depth in some embodiments. A minimum depth of 1.5-inches is preferred to provide suitable clearance between the tire and the closed end of the bowl to prevent locking up of the bowl's movement by accumulation of mud between the tire and the closed end of bowl, particularly in embodiments where the bowl is supported from the interior thereof, although other embodiments supporting the bowl from the outer side of its closed end are also within the scope of the present invention.

Referring again to FIG. 4, the peripheral wall of the illustrated scraper flares outward from the plane of the closed end 52 of the bowl at an angle of forty-five degrees to same. The angle of the peripheral wall relative to the plane of the closed end, or relative to the rotational axis of the bowl, may vary however, for example ranging between thirty and sixty degrees in some embodiments, and more particularly between 40 and fifty degrees in others. Embodiments where the angle from the plane of the closed end of the bowl exceeds sixty degrees may not perform as well, as the steeper incline of the outer face of the peripheral wall reduces the effective cutting action against the oncoming mud, instead presenting more of a flat-on impact face that may be less effective in shearing away the mud buildup from the tire. The pressed disc-shaped plate or sheet forming the bowl may be cut or grinded at the bottom end of the peripheral wall 54 so that the bottom edge 54a thereof joins the two faces 54b, 54c of the wall at forty-five degrees, rather than ninety, in order to a outward-pointing corner or cutting edge 54d at the at the open end 56 of the bowl. That is, the free edge of the peripheral wall opposite the closed end 52 of the bowl is cut, grinded or otherwise machined to lie in a plane perpendicular to the axis A2 of the bowl in its finished state. The resulting sharpness at the free end of bowl increases the clean peeling and cutting effect of the bowl on the mud being scraped from the wheel, and any other debris (e.g. straw) carried with the mud. It may be possible to accomplish the sharpening of the bowl's scraping end by cutting the circumference of the circular disc at forty five degrees to the plane of the initially flat disc before pressing the disc into the bowl shape. In another fabrication process, the edge may instead be ground into this shape around the circumference of the bowl's open edge after being pressed into shape.

Figure 9:
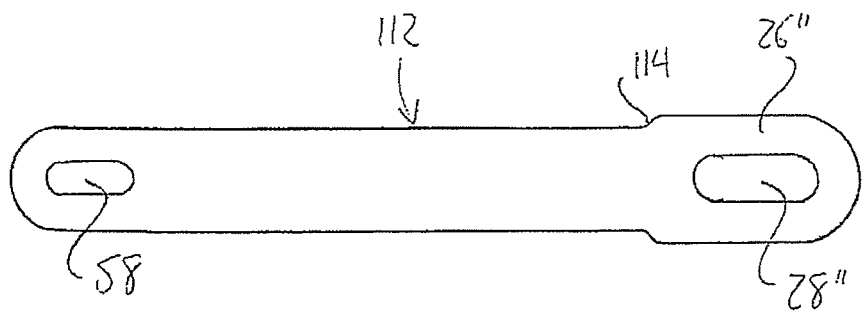
FIG. 9 is an overhead plan view of a strip of material used to produce the support arm of a third embodiment, at an intermediate stage during production thereof.

FIG. 9 shows elongated metal plate 112 similar to that of FIG. 7 for production of a support arm of another embodiment, where the first elongated hole 28" is notably wider than the second elongated hole 58 in order to accommodate a larger axle bolt of a different implement from that shown in FIGS. 1 and 2. The elongated metal plate 112 is thus cut to be wider at the mounting portion 26" that over the lengthwise remainder of the piece. A radiuses transition 114 is used at the change in width to minimize stress concentration effects. In addition, the two ends 116, 118 of the piece are rounded to avoid sharp corners that may present a cutting hazard to an installer during installation of the support arm. The rounded end 116 at the mounting portion 26" of the arm also minimizes the surface area of this portion to reduce the available area at which straw or other material can become caught between the support arm and the packer wheel arm.

FIGS. 10 to 12 illustrate a support arm 124 of another embodiment. Like the preceding embodiments, the arm is formed 124 from a single, unitary, integral, plate member and uses elongated slot-shaped holes for adjustable mounting of the support arm on an agriculture implement and adjustable mounting of the bowl shaped scraper member 50 to the support arm. With reference to FIG. 11, instead of being formed from an initial metal plate of purely linear shape, this embodiment instead uses a generally L-shaped plate with two parallel slot-shaped mounting holes 28a, 28b running longitudinally of a first leg 126 of the L-shaped plate at spaced apart positions therealong for use in the mounting the support arm to the implement, and a single slot-shape hole 58 running longitudinally of the second leg 136 of the L-shaped plate near the distal end thereof furthest from the first leg 126 for use in mounting the bowl shaped scraper member 50 to the support arm. The support arm is formed by bending the plate by approximately ninety degrees along a bend line B4 lying transverse to the length of the second leg 136 a short distance from the first leg 126. Referring to the finished support arm in FIG. 10, the slotted distal end portion of the second leg 136 thus lies approximately ninety degrees out of plane from the first leg of the support arm 124.

Referring to FIGS. 12 and 13, the support arm of FIG. 12 is used on a packing wheel assembly 140 of a type having a pair of wheel support plates 142 disposed between a pair of packer wheels 144. The wheel support plates 142 project downward from an overhead beam or arm 145 running longitudinally of the implement frame at a height above the wheels. A respective support arm 124 is mounted to a flat outer face of each wheel support plate 142 at elevations above the respective wheel using a nut and bolt fastener 146 engaged through each of the two slot-shaped holes 28a, 28b in the first leg 126 of the support arm 124. The elongated slot-shapes of these mounting holes 28a, 28b allow the height of the support arm to be adjusted relative to the respective wheel mounted on the same wheel support plate. The first leg 126 of the support arm 124 extends obliquely downward and rearward from a position substantially in a same vertical plane as the wheel axis A1. The second leg 136 turns approximately ninety degrees from the first leg to jut a short distance obliquely upward and rearward, before the bend in the second leg causes the remainder of the second leg to jut substantially horizontally outward in a lateral direction jutting out over the respective packer wheel 142 over an upper rear quadrant thereof. The single slot shaped hole 58 extends in this lateral direction to allow laterally-adjustable mounting the bowl shaped scraper member 50, as described for other embodiments. The plane of this outwardly jutting distal portion of the second leg is obliquely oriented to slope downward and rearward at an angle tilted out of parallel with the tangential plane of the wheel, as described above for other embodiments. With reference to FIG. 13, it will be appreciated that the two-wheel packer wheel assembly employs two of the support arms 124, which differ only in the direction in which the bend B4 is made.

In the preceding embodiments, each support arm is a single, unitary, integral piece forming the sole support between the fasteners attaching the assembly to the implement and the bolt defining the rotation shaft of the rotating bowl-shaped scraper, thus providing advantage in terms of ease of assembly. FIGS. 14 to 16 illustrate an alternative embodiment that instead employs a multi-piece support assembly to carry the scraper on the implement, but adds additional adjustability as a result of this increase in the number of components.

A first support piece 200 provides a substantial portion of the overall reach of the assembly from where it attaches to the implement frame to where it carries the bowl-shaped scraper member 50, and thus may considered the support arm or primary support of this embodiment. The support arm 200 is formed of a length of angle iron that has been bent (as best shown at B5 in FIG. 14) in one of its two cross-sectional legs at a bend line transverse to the angle iron's length. The bend was accommodated by cutting away a notch of sufficient angular span in the other leg of the angle iron at the bend line to accommodate the desired angle of bend. The two halves of this leg of the angle iron were then welded back together.

A first lengthwise span 202 of the angle iron forms the mounting portion for attachment to the implement frame, and the second lengthwise span 204 forms the portion to which the bowl-shaped scraper member is to be attached via a second support piece described below. At the free end of the first span 202, which defines the mounting end of the support arm 200, the bent cross-sectional leg of the angle iron has a greater width than the remainder of the angle iron. This widened end portion 206 features four parallel, slot-shaped mounting holes 208 lying in the lengthwise direction of the angle iron. These mounting holes 208 are arranged in aligned pairs, where the elongation axis of each hole's elongated slot-shape aligns with that of one other hole, and a position of each hole along this direction of elongation aligns with one other hole.

As best shown in FIG. 16, the second lengthwise span 204 features two elongated slot-shaped holes 210 positioned with their elongation axes aligned and located at spaced apart positions along the second span 204. The second support piece 212 is a flat, L-shaped plate, having two circular holes situated in a first leg 214 of its L-shape, and a single slot-shaped hole 215 in its second leg 216 that runs lengthwise of this second leg. Each bolt 218 is passed through a respective hole in the first leg 214 of the second support piece 212, and through a respective one of the slot-shaped holes 210 in the second span 204 of the first support piece 200, and then engaged with a suitable nut 218a to fasten the two supported pieces together. The second leg 216 of the second support piece projects laterally to one side of the first support piece 202. The elongated form of the slot-shaped holes in the first support piece 200 allows adjustment of the position of the second support piece along the lengthwise direction of the second span of the first support piece. The bolt 88 defining the rotational axis A2 of the bowl-shaped scraper is passed through the slot shaped hole 215 in the second leg of the L-shaped second support piece 212 and through a spacer 78' disposed beneath the second support piece, and onward through the bottom end of the spacer 78' into the interior of the bowl-shaped spacer via the flange bearing mounted thereon, where a nut is engaged on the bolt inside the bowl in order to complete the rotational coupling of the scraper to the second support piece.

FIG. 15 illustrates use of this embodiment of the scraper assembly on a gang of packer wheels 220. Although only one scraper assembly is shown, it will be appreciated that one scraper is preferably provided for each wheel. The wheels 222 of the gang 220 are rotatably mounted on a common shaft carried on a frame 224 that supports the shaft adjacent opposite ends thereof. The frame features a front cross member 226 lying parallel to the wheel shaft at a position ahead of the wheels in the forward travel direction F of the implement, side rails 228 that extend rearward from the front cross-member at opposing ends thereof to support the respective ends of the wheel shaft, and a rear cross-member 230 lying parallel to the front cross-member at a location carried behind the wheels.

The widened lower end 206 of the first support piece 200 is placed flush against the front-facing side of the rear cross-member of the frame of the packer wheel gang assembly, which is formed by rectangular tubing in the illustrated embodiment. A respective square U-bolt 232 is passed through each pair of end-to-end mounting holes 208 from the rear side of the rear cross member, whereby the two legs of the U-bolt respectively embrace over and under the rear cross-member 230. With the U-bolts tightened with suitable nuts at the front side of the widened end portion of the first support piece 200, the first lengthwise span 202 thereof stands upright from the rear cross-member of the frame. Having been bent out of its original alignment with the first span by an acute angle, so as to lie obliquely to the first span at an obtuse angle, the second span 202 angles upward and forward from the top end of the first span, reaching forwardly to a position overlying the gang of packer wheels.

The fore-aft position of the scraper member over the gang of packer wheels can be adjusted through sliding of the second support piece 212 along the lengthwise dimension of the first piece's second span 202, as afforded by the slidability of bolt fasteners 218 in the slots 210 of the first piece when sufficiently loosened, after which re-tightening of the bolts will secure the selected fore/aft position of the bowl-shaped scraper carried on the second support piece. In addition to positioning of the bowl-shaped scraper over a respective one of the packer wheels 222 by the selected mounting position of the first support piece along the rear cross member, fine tuning of the lateral position of the scraper can be achieved through relative sliding of the scraper bolt 88 along the slot 215 of the second support piece 212. This added lateral adjustability can also be helpful in ensuring appropriate placement of multiple scrapers over each packing wheel 222 in the gang 220 regardless of whether a mounting position for the first support piece is available on the rear cross member in ideal alignment with the respective wheel 222.

In comparing FIGS. 15 and 16, it will be realized that the side of the first support piece to which the second support piece extends can be switched by simply inverting the second support piece relative to the first, thereby maximizing the attainable scraper positions for each support assembly. This added adjustability of a multi-piece support structure can be employed in any of a number of different applications, and not just for the gang wheel context in which it is illustrated. Likewise, gang wheel applications may employ mounting positions and details other than those shown for this particular embodiment. As an alternative to having fore/aft adjustments slots 210 in the first support piece and the lateral adjustment slot 215 in the second support pieces, other embodiments may have these slots all formed in the second piece. The illustrated embodiment uses two fore/aft slot and bolt pairings to automatically prevent swiveling between the first and second supports even if one or both of the bolts should become loose, but as little as one slot can be used to provide fore/aft adjustment in other embodiments. While the use of angle-iron provides increased support strength through added rigidity of the long-reaching first support piece of the illustrated embodiment, other two-piece embodiments may employ a flat-plate or other support piece structure.

While earlier embodiments had the support arm arranged to extend into the interior of the bowl-shaped scraper member, FIGS. 14 to 16 demonstrate that some embodiments of the present invention may have the support arm suitably shaped and dimensioned to rotatably support the bowl from the exterior side of the closed end of the bowl, for example to replace the multi-piece exterior-support structure of the aforementioned Seda reference. However, the an internal connection of the bowl and support arm provides for an elegant solution for keeping the rotational connection components concealed and protected, and thus may be preferred in applications where suitable mounting space is available to allow for internal support of the bowl. However, suitable spacing for support of the bowl from below may not always be available, as demonstrated by the ganged wheel context of FIG. 15 where the packer wheels are closely spaced, and overhead support of the bowl from a cross-member of the frame ahead or behind the wheels offers a suitable solution.

FIG. 17 illustrates another two-piece support arrangement in which a first support piece 400 mounts to the implement and a second piece 402 is adjustably attached to the first piece to carry the bowl shaped scraper 50 in a suitable scraping position over a packing wheel 404. In this embodiment, the hub of the packing wheel 404 is mounted to a hub plate 406, which in turn is fastened to the trailing arm 408 of the packer wheel assembly. The hub mounting-plate 406 features an arcuate slot-shaped hole 410 whose radius is centered on a bolted connection 412 defined between the trailing arm 108 and the hub plate 406 to form a pivotal connection therbetween about a horizontal axis parallel to the packer wheel's rotational axis A1. This way, a second bolted connection 414 between the trailing arm 408 and the hub plate 406 takes place through the arcuate hole 410 so that when this bolted connection is sufficiently loosened, relative pivoting can be effected between the trailing arm and the hub plate in order to set a height of the packer wheel's rotational axis A1 relative to the trailing arm. The selected wheel axis position is then locked by retightening of the bolted connection 414 at the arcuate hole 410.

The first support piece 400 is a flat plate of elongated shape, and is bolted to an outer side of the hub plate 406 that faces away from the packer wheel 404 at a location below the trailing arm 408, which is also bolted to the outer side of the hub plate. The first support piece 400 lies in a generally horizontal position generally parallel to the trailing arm 408, the term generally being used in view of the fact that the angle of the first support piece will vary depending on the selected position of the hub plate 406 relative to the trailing arm 408. A forward end of the first support piece 400 projects forwardly past a leading edge of the hub plate 406, and a downturned foot portion 416 of the first piece 400 turns ninety degrees downward from an otherwise linear remainder of the first piece that defines the piece's direction of elongation.

The second piece is also formed of a plate, but has been provided with a single ninety degree bend or curve therein near one end to define a scraper carrying portion 44 like that of the support arm of FIGS. 1 to 4. The flat remainder 418 of the second piece 402 is placed against the inner face of the foot portion 416 of the first piece so as to lie generally in the same vertical plane as the hub plate 406 at a position a short distance ahead thereof and to the inside of the trailing arm. Accordingly, this flat lower portion of the second piece runs upward at approximately ninety degrees to the lengthwise direction of the first piece at a location ahead of the wheel axis A1 in a generally vertical plane between the trailing arm and the packing wheel. This flat portion is of sufficient length to place the scraper carrying portion in a position above the tire of the packing wheel in order to carry the scraper bowl in the same manner as described for the first embodiment of FIGS. 1 to 4. The slot-shaped hole of the scraper carrying portion of the second piece can be used to adjust the lateral position of the bowl in same manner as the preceding embodiments.

The flat portion 418 of the second piece features a slot-shaped elongated hole 420 running in the length direction of the strip-shaped piece. Two bolts 422 fed through respective holes in the foot portion 416 of the first piece 400 engage through the slot-shaped hole 420 of the second piece, and are slidable therein when sufficient loosened. Accordingly, the second piece 402 can slide up and down in relation to the first piece in order to set the desired height of the scraper 50 rotatably carried atop the second piece. The use of two bolts in this connection of the two pieces prevents relative rotation between the pieces about the axis of either bolt.

By mounting the support assembly to the hub plate 406 that carries the wheel, the position of the scraper does not need to be separately adjusted when the wheel position is changed, as the support assembly moves with the hub plate and attached wheel during this wheel position adjustment.

By using two separate pieces, the same two pieces can be used on any wheel of the implement regardless of which side of the wheel the trailing arm is on. FIG. 17 shows the scraper installed on a wheel that is carried by the trailing arm on its right side. The same two pieces can be used on a packing wheel on the other side of the machine, simply by switching the second piece from the left hand side of the first piece to the right hand side thereof, and flipping the second piece horizontally so that the scraper carrying portion projects to the correct side so as to place the bowl shaped scraper over the packing wheel. In the two-piece support embodiment of FIGS. 14 to 16, the adjustment slots are used for fore/aft and lateral adjustments, and thus lie in parallel planes. In this embodiment, the two adjustment slots are used for upward/downward and lateral adjustments, and thus lie in perpendicular planes.

It will be appreciated that a scraper device of the present invention may be employed on ground engaging wheels other than packer wheels of an agricultural implement, for example of frame-carrying wheels of such an implement or wheels of a rolling machine or apparatus, towed or self-conveying, regardless of whether used for agricultural or other purposes. The illustrated embodiments depict mounting arrangements for various commercially available packer wheel assemblies, including commercially available agricultural implements from Seed Hawk (FIGS. 1-3), Seed-Master (FIG. 17) and Cross Slot (FIGS. 12-13), but it will be appreciated that aspects of the present invention may be employed on various other brands and types of machinery as well.

While the forgoing embodiments have described use of the bowl-shaped scrapers of the present invention for the purpose of scraping mud buildup or other debris from packing wheels, it will be appreciated that the scrapers may also be used to clean other ground-engagement members, for example rotating discs of the type used on a variety of agriculture implements for working the ground or opening a furrow in the same.

Figure 18:
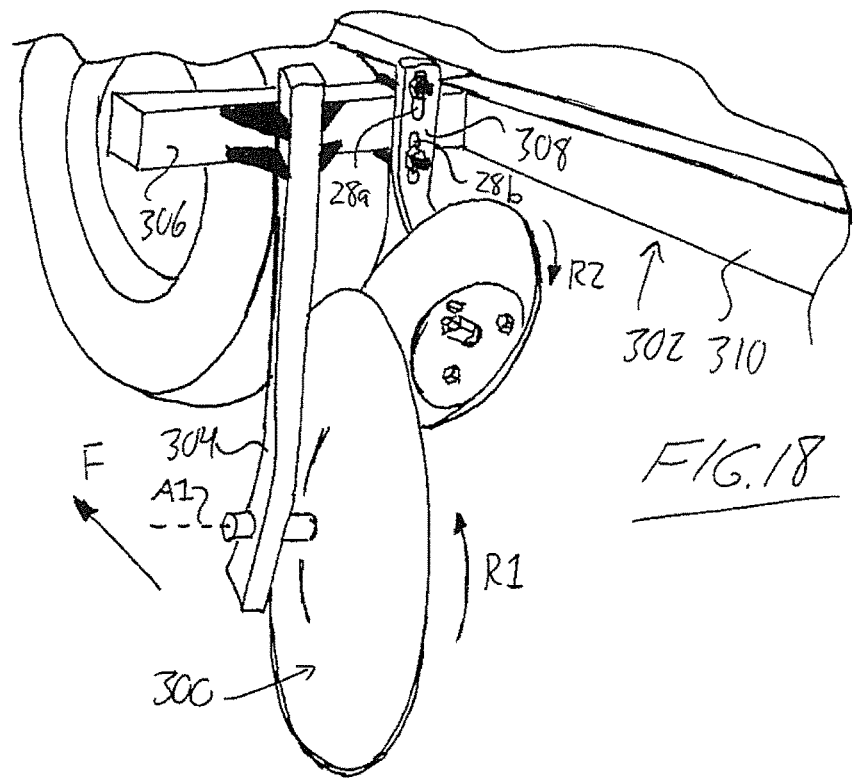
FIG. 18 is a schematic rear perspective view of a seventh embodiment support arm installed on an agricultural implement to carry the bowl shaped scraper in a position cleaning a ground-engaging disc of the implement.
Figure 19:
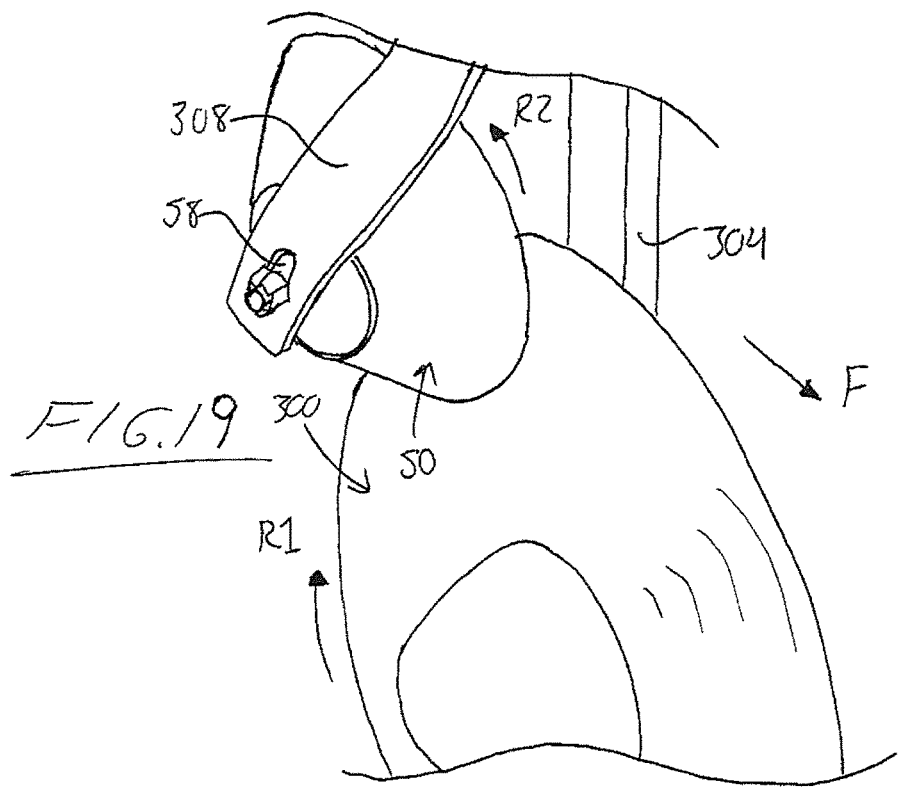
FIG. 19 is a schematic front perspective view of the support arm, scraper and ground-engaging disc of FIG. 18.

FIGS. 18 and 19 illustrate such an embodiment, in which a ground-engaging disc 300 is carried on a frame 302 of an agriculture implement by a support leg 304 depending downward from a cross-wise frame member 306 laying transverse to the forward working direction F of the implement. The disc is rotatably carried on the support leg 304 for rolling engagement with the ground below in a predetermined direction R1 about the disc's rotational axis A1. The illustrated embodiment features a bowl-shaped scraper 50 of the type described above carried on a support arm 308 that depends from the same frame member 306 as the disc's support leg 304 at a location between the support leg and a longitudinal member 310 of the frame 302. Similar to earlier embodiments, the support arm is a single unitary plate member having slot shaped mounting holes 28*a*, 28*b* for accommodating a square U-bolt 102 to clamp the arm to the implement frame, and another elongated, slot-shaped hole 58 for adjustable positioning of the bowl-shaped scraper member.

The scraper 50 of the illustrated embodiment is positioned with the open end of the bowl facing toward a concave trailing side of the disc so that the sharpened edge at the open end of the bowl will scrape away mud carried on this face of the disc at or near the periphery thereof. The positioning of the scraper relative to the disc closely follows that of aforementioned U.S. Pat. No. 1,791,462 of Bermel, and thus is not described herein in further geometric detail. While dish-shaped rotational scrapers are known from Bermel and other references, as mentioned in the background section above, the use of scraper and support arm features of the present invention may present notable advantage over the prior art arrangements, including one or more of the use of bends and/or twists in a support arm to attain suitable positioning of the scraper with minimal number of parts, alternative use of multiple support pieces allowing adjustability therebetween, use of one or more elongated slot shaped holes for positional adjustability of the scraper relative to implement frame, the disc and possibly the support piece(s), the frusto-conical form of the scraper providing a suitable flattened end for flush mounting of a bearing, a sharpened scraping edge on the scraper for an improved pealing of mud or other debris from the disc, etc.

FIGS. 20 and 21 illustrate an alternative to the bowl mounting details of FIG. 4. In this embodiment, instead of reaching into the interior of the bowl 50, the support arm 24 instead resides entirety outside the bowl, with the scraper-carrying portion 44 reaching inwardly over the closed end wall 52 of the bowl 50 to a position overlying the centrally positioned through-hole of the bowl's closed end. A seal housing 60' is mounted on the outer face or external surface of the closed end wall 52 of the bowl via a flat annular outer flange 62' seated flush atop the closed end 52 of the bowl and secured thereto, for example in the same manner described for the bearing housing of the FIG. 4 embodiment. The seal housing 60' further includes a raised central cap 72' that cooperates with the bowl's end wall 52 to bound an interior space 68 of the housing 60', which contains a rubber seal 70. A metal bushing 78' passes downwardly through a hole in the central cap 72 of the seal housing, and onward through the central through-hole of the bowl's closed end 52. In this embodiment, the bearing housing 60 is inside the bowl, where its annular outer flange 62 is clamped against the inner face or interior surface of the closed end wall 52. The inner race of the bearing 74 is engaged to the outer circumference of the bushing 78 at a stepped-down lower end thereof of lesser diameter than the upper reminder of the bushing that reaches upwardly through the seal housing to the support arm. As shown, an annular shim flange or spacer 63 may be sandwiched between the annular outer flange of the bearing housing 60 and the end wall 52 of the bowl 50.

The bolt 88 for fastening the bowl 50 to the support arm 24 has its head 90 disposed inside the interior space of the bowl, from which the bolt shaft 86 reaches upwardly through the bushing 78' and onward through the second-through hole 58 of the support arm 24 via a pair of washers 92, 94 disposed atop and beneath same. Nut 96 is threaded onto the bolt shaft 86 from the top end thereof outside the bowl and above the support arm 24. The head 90 of the bolt abuts against the underside of the bearing's inner race via a washer 84, whereby the tightened state of the bolt 88 and nut 96 clamps the 78 bushing to the underside of the support arm 24. With the outer race of the bearing 74 captured in the interior of the bearing housing between the inner flange or lip 72 of the bearing housing 60 and the end wall 52 of the bowl 50, and with the bearing housing affixed to the end wall 52 of the bowl, e.g. by bolts 64 fastened through the annular outer flanges of the seal and bearing housings 60', 60 via the bowl's end wall 52 and the optional shim flange or spacer 63, the bowl 50 is thus rotatable about the axis A2 shared by the bolt 88 and the surrounding bushing 78'.

To prevent straw or other material from becoming wrapped up in the space outside the bowl between the closed end of the bowl and the bowl-carrying portion of the support arm, a cylindrical outer sleeve 500 is disposed externally around the bushing 78' and has an axial length slightly lesser than the distance between the topside of the seal housing and the underside of the support arm, and an inner diameter exceeding the outer diameter of the bushing, whereby the protective outer sleeve 500 is freely rotatable around the bushing. This embodiment thus provides rotatable hanging support of the bowl from a position outside and above the bowl, and incorporates a solution to avoid wrapped straw accumulation that can build up and interfere with the rotational action of the scraper.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A scraper assembly for cleaning a ground-engaging member of an agricultural implement, said assembly comprising:
    a bowl-shaped scraper having a hollow interior that is bound by a peripheral wall and is closed at one end by an end wall;
    a support arm having a mounting portion configured for attachment to said agricultural implement and a bowl-carrying portion arranged to reside outside said hollow interior of the bowl-shaped scraper;
    a bearing having an outer race and an inner race, said outer race being attached or attachable to the end-wall of the bowl-shaped scraper;
    a bushing fastened or fastenable between said mounting portion of the support arm and said inner race of the bearing to carry the bowl-shaped scraper on said bushing in a manner rotatable about said bushing at an axial distance from the bowl-carrying portion of the mounting arm; and
    a protective sleeve received or receivable in a position spaced axially from the bearing and spanning around a portion of the bushing that resides outside the bearing between the end-wall of the bowl-shaped scraper and the bowl-carrying portion of the support arm, said protective sleeve being freely rotatable around said bushing separately of the bearing.

2. A scraper assembly for cleaning a ground-engaging member of an agricultural implement, said assembly comprising:
    a bowl-shaped scraper having a hollow interior that is bound by a peripheral wall and is closed at one end by an end wall;
    a support arm having a mounting portion configured for attachment to said agricultural implement and a bowl-carrying portion residing outside said hollow interior of the bowl-shaped scraper;
    a bearing having an outer race and an inner race, said outer race being attached to the end-wall of the bowl-shaped scraper;
    a bushing fastened between said mounting portion of the support arm and said inner race of the bearing and carrying the bowl-shaped scraper on said bushing in a manner rotatable about said bushing at an axial distance from the bowl-carrying portion of the mounting arm; and
    a protective sleeve received in a position spaced axially from the bearing and spanning around a portion of the bushing that resides outside the bearing between the end-wall of the bowl-shaped scraper and the bowl-carrying portion of the support arm, said protective sleeve being freely rotatable around said bushing separately and independently of the bearing.

3. An agricultural implement comprising:
    a frame;
    at least one ground-engaging member rotatably coupled to the frame for rotation about a rotational axis of said ground-engaging member;
    a bowl-shaped scraper having a hollow interior that is bound by a peripheral wall and is closed at one end by an end wall;
    a support arm having a mounting portion attached to said frame and a bowl-carrying portion residing outside said hollow interior of the bowl-shaped scraper;
    a bearing having an outer race and an inner race, said outer race being attached to the end-wall of the bowl-shaped scraper;
    a bushing fastened between said mounting portion of the support arm and said inner race of the bearing to carry the bowl-shaped scraper on said bushing in a manner rotatable about said bushing at an axial distance from the bowl-carrying portion of the mounting arm; and
    a protective sleeve received in a position spaced axially from the bearing and spanning around a portion of the bushing that resides outside the bearing between the end-wall of the bowl-shaped scraper and the bowl-carrying portion of the support arm, said protective sleeve being freely rotatable around said bushing separately and independently of the bearing.

4. The scraper assembly of claim 1 wherein the bearing is mounted or mountable within the hollow interior of the bowl-shaped scraper.

5. The scraper assembly of claim 2 wherein the bearing is mounted within the hollow interior of the bowl-shaped scraper.

6. The agricultural implement of claim 3 wherein the bearing is mounted within the hollow interior of the bowl-shaped scraper.

7. The scraper assembly of claim 1 comprising a bearing housing that is separate from the sleeve and in which the outer race of the bearing is contained.

8. The scraper assembly of claim 2 comprising a bearing housing that is separate from the sleeve and in which the outer race of the bearing is contained.

9. The agricultural implement of claim 3 comprising a bearing housing that is separate from the sleeve and in which the outer race of the bearing is contained.

10. The scraper assembly of claim 4 comprising a bearing housing that is separate from the sleeve and in which the outer race of the bearing is contained.

11. The scraper assembly of claim 5 comprising a bearing housing that is separate from the sleeve and in which the outer race of the bearing is contained.

12. The agricultural implement of claim 6 comprising a bearing housing that is separate from the sleeve and in which the outer race of the bearing is contained.

* * * * *